United States Patent
Izuno et al.

(10) Patent No.: US 9,839,839 B2
(45) Date of Patent: Dec. 12, 2017

(54) INFORMATION PROCESSING SYSTEM INCLUDING A PORTABLE TERMINAL AND A WIRELESS CONTROLLER EACH WIRELESSLY CONNECTED TO AN INFORMATION PROCESSING DEVICE

(71) Applicant: NINTENDO CO., LTD., Kyoto-shi, Kyoto (JP)

(72) Inventors: Toshiharu Izuno, Kyoto (JP); Shinya Saito, Kyoto (JP); Masahiro Sakurai, Tokyo (JP)

(73) Assignee: NINTENDO CO., LTD., Kyoto-shi (JP)

( * ) Notice: Subject to any disclaimer, the term of this patent is extended or adjusted under 35 U.S.C. 154(b) by 250 days.

(21) Appl. No.: 14/700,488

(22) Filed: Apr. 30, 2015

(65) Prior Publication Data

US 2015/0352439 A1   Dec. 10, 2015

(30) Foreign Application Priority Data

Jun. 5, 2014   (JP) ................. 2014-116568

(51) Int. Cl.
*A63F 9/24*   (2006.01)
*A63F 13/235*   (2014.01)
(Continued)

(52) U.S. Cl.
CPC .......... *A63F 13/235* (2014.09); *A63F 13/323* (2014.09); *A63F 13/327* (2014.09);
(Continued)

(58) Field of Classification Search
CPC .......... A63F 13/00; A63F 13/06; A63F 13/12; A63F 13/20; A63F 13/24; A63F 13/245; A63F 13/26; A63F 13/428; A63F 13/92
(Continued)

(56) References Cited

U.S. PATENT DOCUMENTS

| 2004/0229687 A1 | 11/2004 | Miyamoto et al. |
| 2011/0190061 A1* | 8/2011 | Takeda ................ A63F 13/02 463/39 |

(Continued)

FOREIGN PATENT DOCUMENTS

JP   2004-329744   11/2004

*Primary Examiner* — William H McCulloch, Jr.
*Assistant Examiner* — Chase Leichliter
(74) *Attorney, Agent, or Firm* — Nixon & Vanderhye P.C.

(57) ABSTRACT

An information processing system includes an information processing device, at least one wireless controller which can wirelessly be connected to the information processing device, and at least one portable terminal which can execute any application and display a result of execution thereof and has a wireless communication function. The wireless controller establishes wireless connection to the information processing device in accordance with a first procedure and transmits first operation information representing an input operation onto the wireless controller to the information processing device. The portable terminal establishes wireless connection to the information processing device in accordance with a second procedure different from the first procedure and transmits second operation information representing an input operation onto the portable terminal to the information processing device.

17 Claims, 21 Drawing Sheets

(51) Int. Cl.
| | |
|---|---|
| *A63F 13/42* | (2014.01) |
| *A63F 13/327* | (2014.01) |
| *A63F 13/79* | (2014.01) |
| *A63F 13/58* | (2014.01) |
| *A63F 13/77* | (2014.01) |
| *A63F 13/323* | (2014.01) |
| *A63F 13/26* | (2014.01) |
| *A63F 13/245* | (2014.01) |
| *A63F 13/24* | (2014.01) |
| *A63F 13/92* | (2014.01) |
| *A63F 13/428* | (2014.01) |

(52) U.S. Cl.
CPC .............. *A63F 13/42* (2014.09); *A63F 13/58* (2014.09); *A63F 13/77* (2014.09); *A63F 13/79* (2014.09); *A63F 13/24* (2014.09); *A63F 13/245* (2014.09); *A63F 13/26* (2014.09); *A63F 13/428* (2014.09); *A63F 13/92* (2014.09)

(58) Field of Classification Search
USPC ..................................................... 463/37–39
See application file for complete search history.

(56) References Cited

U.S. PATENT DOCUMENTS

2012/0086630 A1* 4/2012 Zhu ....................... G63F 13/355
  345/156
2012/0309537 A1* 12/2012 Nogami .................. A63F 13/00
  463/39

* cited by examiner

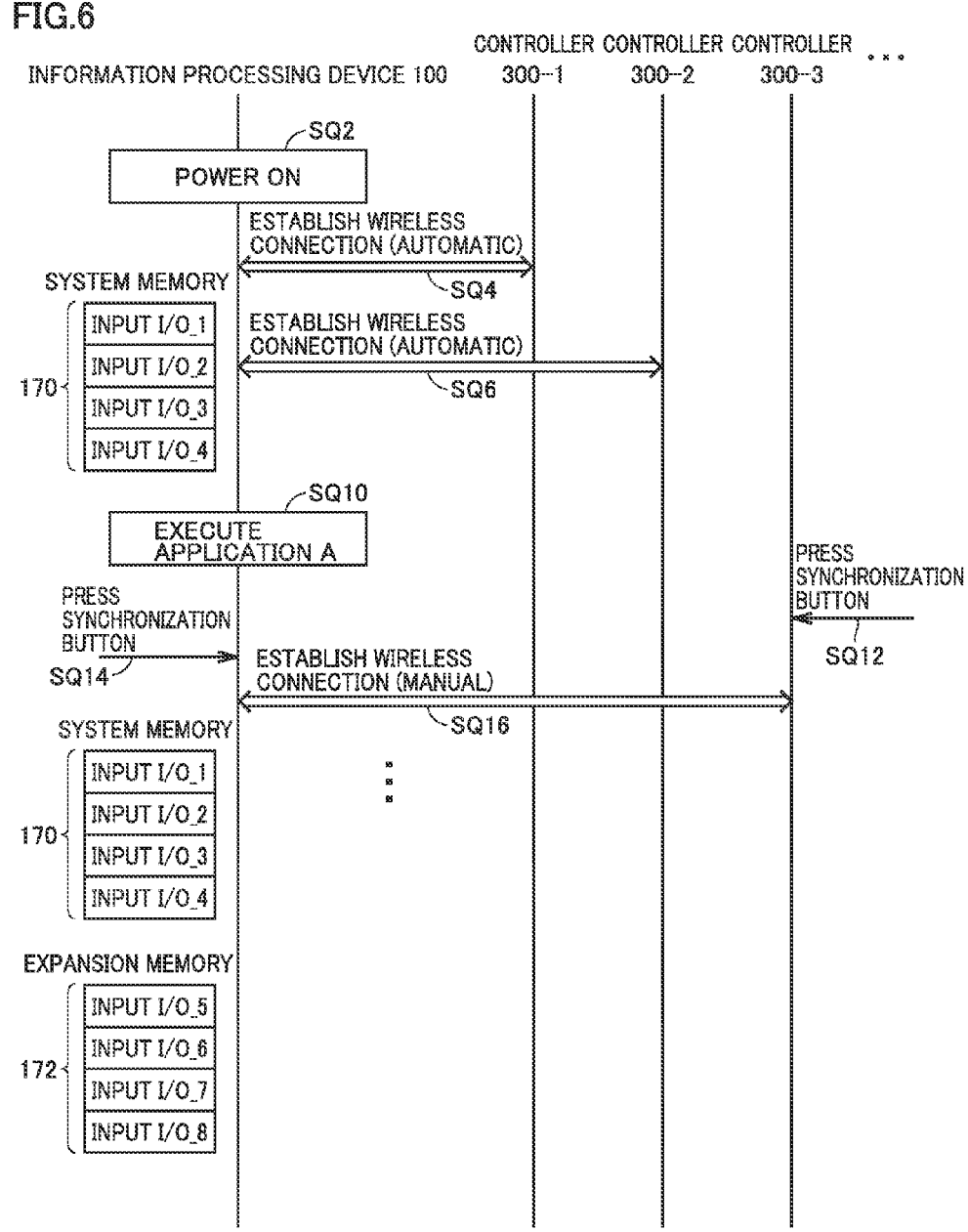

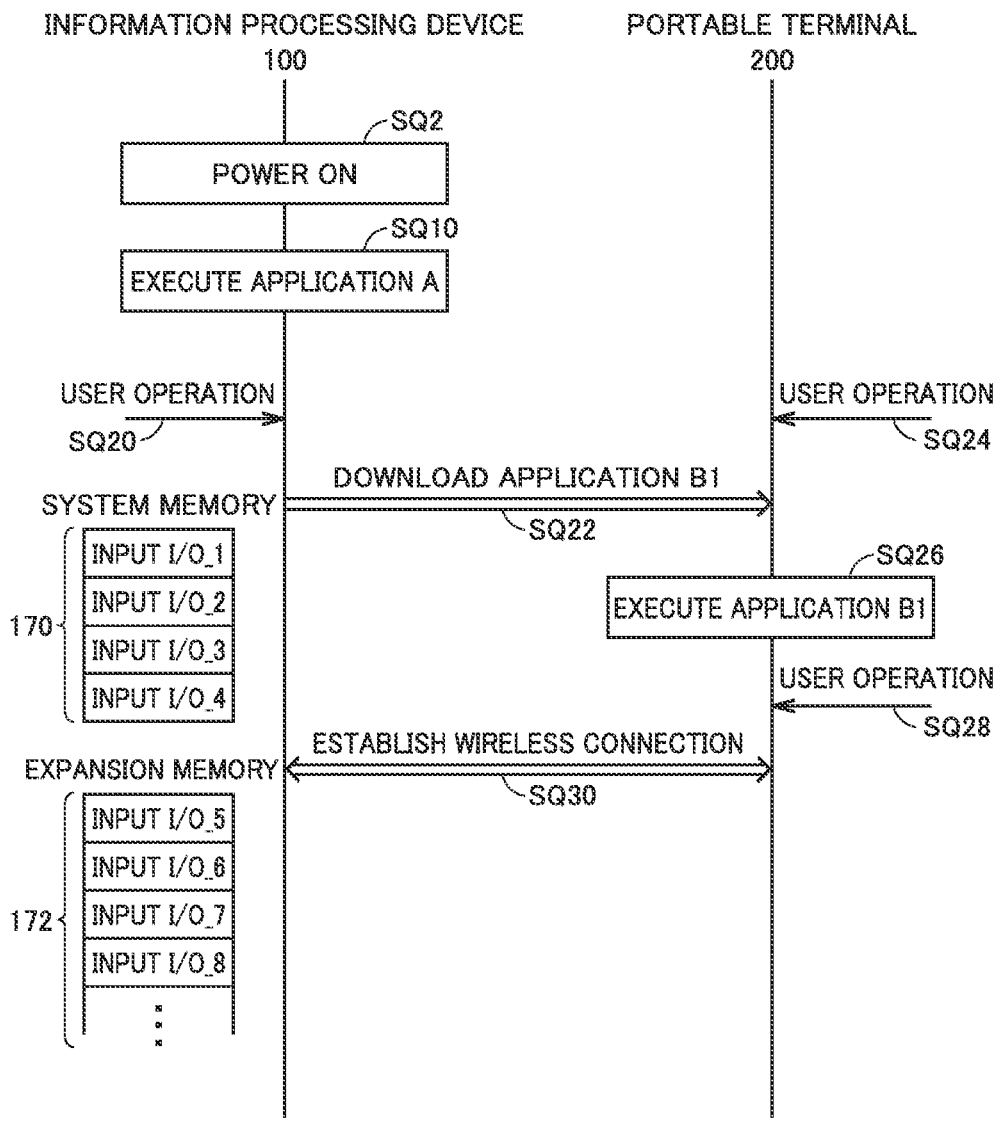

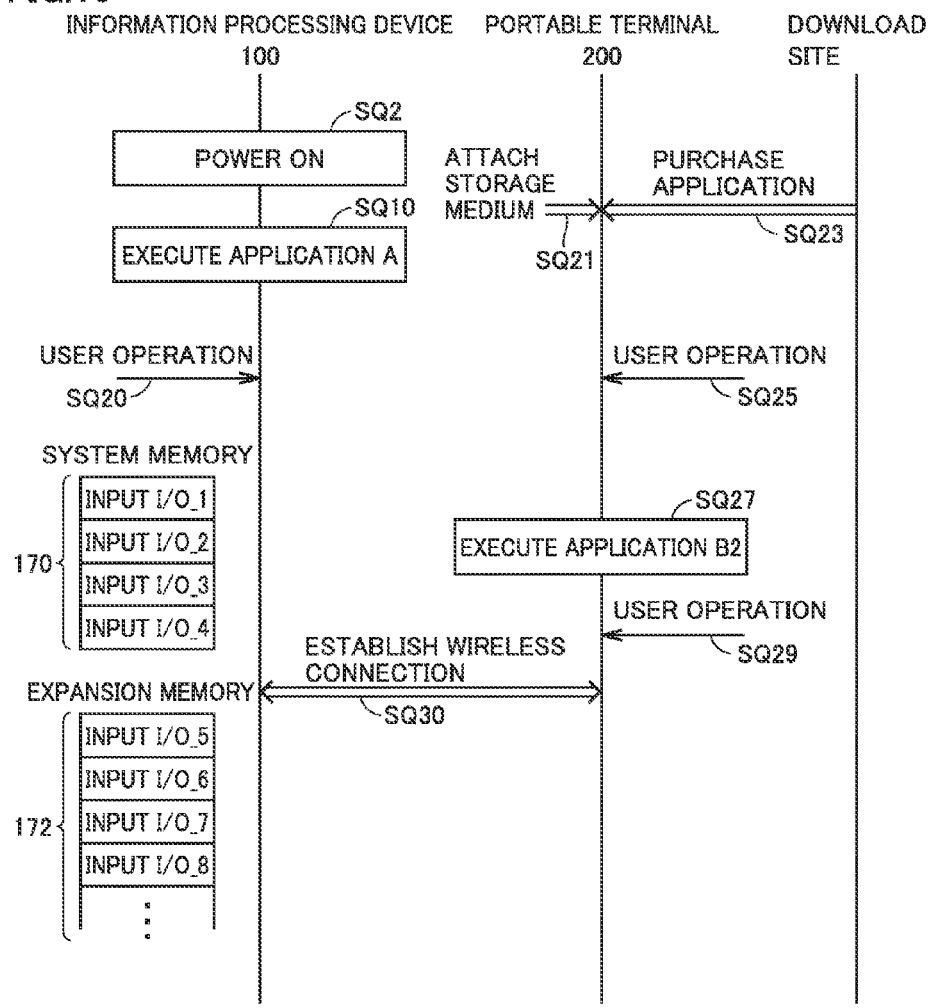

FIG.16

| KEY ALLOCATION INFORMATION | ALIAS NAME | A | B | X | Y | UP | DOWN | RIGHT | LEFT |
|---|---|---|---|---|---|---|---|---|---|
| 1 | SETTING OF John | PUNCH | SPEED UP | CROUCH | JUMP | JUMP | CROUCH | MOVE TO RIGHT | MOVE TO LEFT |
| 2 | SETTING OF David | PUNCH | SPEED UP | JUMP | CROUCH | CROUCH | JUMP | MOVE TO RIGHT | MOVE TO LEFT |
| 3 | SETTING OF Cathy | SPEED UP | PUNCH | PUNCH | JUMP | JUMP | CROUCH | MOVE TO RIGHT | MOVE TO LEFT |
| ⋮ | ⋮ | ⋮ | ⋮ | ⋮ | ⋮ | ⋮ | ⋮ | ⋮ | ⋮ |

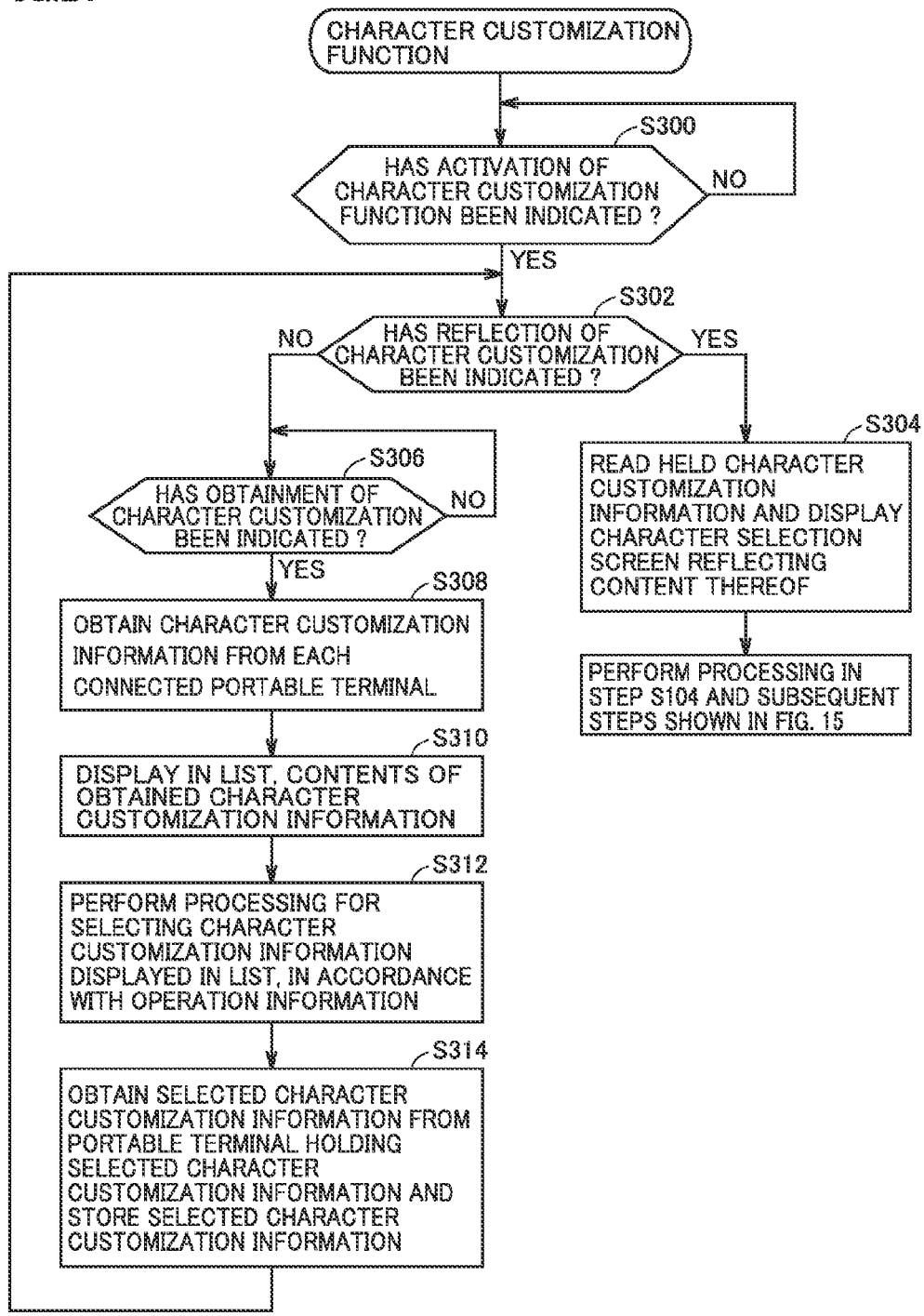

INFORMATION PROCESSING SYSTEM INCLUDING A PORTABLE TERMINAL AND A WIRELESS CONTROLLER EACH WIRELESSLY CONNECTED TO AN INFORMATION PROCESSING DEVICE

This nonprovisional application is based on Japanese Patent Application No. 2014-116568 filed with the Japan Patent Office on Jun. 5, 2014, the entire contents of which are hereby incorporated by reference.

FIELD

The technology herein relates to an information processing system in which a plurality of types of devices can be used as controllers, an information processing device configuring the information processing system, a non-transitory storage medium encoded with a computer readable information processing program implementing the information processing device, and an information processing method associated with the information processing system.

BACKGROUND AND SUMMARY

Such a configuration that a portable game device and controllers are connected to a video game device has been known.

In this configuration, the portable game device and the plurality of controllers are connected through wires to connectors of the video game device, and the configuration has been unable to adapt to connection through wireless communication.

According to a certain configuration example, such a novel configuration that a portable terminal and a wireless controller are wirelessly connected to an information processing device and any of the portable terminal and the wireless controller can be used as a controller is provided.

An exemplary embodiment provides an information processing system that includes an information processing device, at least one wireless controller which can wirelessly be connected to the information processing device, and at least one portable terminal which is adapted to execute any application and display a result of execution thereof and has a wireless communication function. The wireless controller establishes wireless connection to the information processing device in accordance with a first procedure and transmits first operation information representing an input operation onto the wireless controller to the information processing device. The portable terminal establishes wireless connection to the information processing device in accordance with a second procedure different from the first procedure and transmits second operation information representing an input operation onto the portable terminal to the information processing device.

In the exemplary embodiment, the second procedure includes more procedures than the first procedure.

In the exemplary embodiment, the first procedure can be performed at any time and the second procedure is allowed to be performed when the information processing device is in a prescribed state.

In the exemplary embodiment, the first procedure includes an input operation onto the wireless controller, and the second procedure includes an input operation for executing a second application in the portable terminal and an input operation onto the portable terminal while the second application is running.

In the exemplary embodiment, the portable terminal obtains the second application from the information processing device.

In the exemplary embodiment, the portable terminal obtains the second application from a medium or a device different from the information processing device.

In the exemplary embodiment, the information processing device executes a first application and activates as a controller to be used in the first application, among wireless controller(s) and portable terminal(s) wirelessly connected to the information processing device, any onto which a prescribed input operation has been performed while the first application provides display of a prescribed screen.

In the exemplary embodiment, the total number of wireless controllers and portable terminals which can wirelessly be connected to the information processing device is greater than the number of controllers used in the first application, and the information processing device activates successively as controllers, among the wireless controller(s) and the portable terminal(s) wirelessly connected to the information processing device, any onto which the prescribed input operation has been performed, until the number of the activated wireless controllers and portable terminals reaches a prescribed number.

In the exemplary embodiment, the portable terminal is provided with a plurality of types of keys for accepting an input operation, the portable terminal holds key allocation information indicating correspondence between each key and an operation in the second application, and the information processing device receives the key allocation information held in the wirelessly connected portable terminal and makes the key allocation information available.

In the exemplary embodiment, the portable terminal transmits the key allocation information to the information processing device when the second application has been obtained from a medium or a device different from the information processing device.

In the exemplary embodiment, the portable terminal transmits information on an object held in advance to the information processing device, and when the information processing device receives the information on the object from the portable terminal, the information processing device makes the received information on the object available in the first application.

In the exemplary embodiment, when the second application has been obtained from a medium or a device different from the information processing device, the portable terminal transmits the object to the information processing device.

In the exemplary embodiment, at least one wired controller which can be connected through a wire to the information processing device is further included.

An exemplary embodiment provides an information processing device that includes a first module for wireless connection to at least one wireless controller and a second module for wireless connection to at least one portable terminal having a wireless communication function. The portable terminal is adapted to execute any application and display a result of execution thereof. The first module establishes wireless connection to the wireless controller in accordance with a first procedure and receives first operation information representing an input operation onto the wireless controller. The second module establishes wireless connection to the portable terminal in accordance with a second procedure different from the first procedure and receives second operation information representing an input operation onto the portable terminal.

An exemplary embodiment provides a non-transitory storage medium encoded with a computer readable information processing program executed by a computer. The computer includes a module for wireless connection to at least one wireless controller and a module for wireless connection to at least one portable terminal having a wireless communication function. The portable terminal is adapted to execute any application and display a result of execution thereof. The information processing program causes the computer to perform the steps of establishing wireless connection to the wireless controller in accordance with a first procedure and receiving first operation information representing an input operation onto the wireless controller and establishing wireless connection to the portable terminal in accordance with a second procedure different from the first procedure and receiving second operation information representing an input operation onto the portable terminal.

An exemplary embodiment provides an information processing method performed in an information processing system. The information processing system includes an information processing device, at least one wireless controller which can wirelessly be connected to the information processing device, and at least one portable terminal which is adapted to execute any application and display a result of execution thereof and has a wireless communication function. The information processing method includes a step in which the wireless controller establishes wireless connection to the information processing device in accordance with a first procedure and transmits first operation information representing an input operation onto the wireless controller to the information processing device and a step in which the portable terminal establishes wireless connection to the information processing device in accordance with a second procedure different from the first procedure and transmits second operation information representing an input operation onto the portable terminal to the information processing device.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 6 shows an exemplary illustrative non-limiting sequence diagram illustrating a procedure for establishing wireless connection between the wireless controller and the information processing device.

FIG. 7 shows an exemplary illustrative non-limiting sequence diagram illustrating a procedure for establishing wireless connection between the portable terminal and the information processing device.

FIG. 10 shows an exemplary illustrative non-limiting sequence diagram illustrating another procedure for establishing wireless connection between the portable terminal and the information processing device.

FIG. 16 shows an exemplary illustrative non-limiting table illustrating one example of key allocation information used in the information processing system according to the present embodiment.

FIG. 21 shows an exemplary illustrative non-limiting flowchart illustrating a processing procedure in connection with the character customization function provided by the information processing device according to the present embodiment.

DETAILED DESCRIPTION OF NON-LIMITING EXAMPLE EMBODIMENTS

Figure 1:
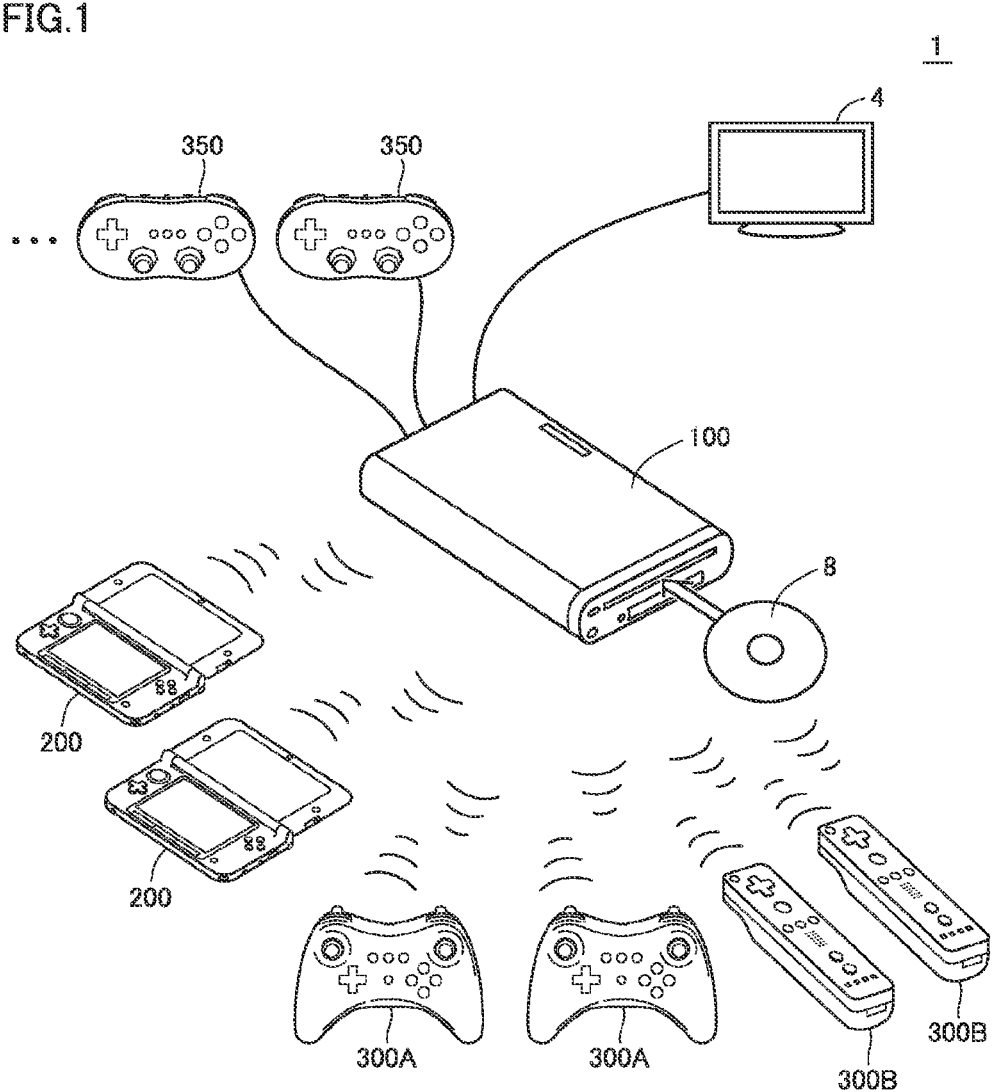
FIG. 1 shows an exemplary illustrative non-limiting schematic diagram illustrating one form of use of an information processing system according to the present embodiment.

The present embodiment will be described in detail with reference to the drawings. The same or corresponding elements in the drawings have the same reference characters allotted and description thereof will not be repeated. In the embodiment below, though a system performing mainly game processing will be exemplified by way of example of an information processing system, the embodiment is not limited thereto and application to various types of information processing (such as image processing or communication processing) is also acceptable.

A. Configuration Example

An information processing system 1 in the present embodiment and a configuration of each device configuring information processing system 1 will initially be exemplified.

[a1: Information Processing System 1]

Referring to FIG. 1, information processing system 1 includes an information processing device 100, a portable terminal 200, and wireless controllers 300A and 300B. Portable terminal 200 and wireless controllers 300A and 300B have a wireless communication function and can wirelessly be connected to information processing device 100. A wired controller 350 may be connected through a wire to information processing device 100. Namely, information processing system 1 may further have at least one wired controller 350 which can be connected through a wire to information processing device 100.

In information processing system 1, any of portable terminal 200, wireless controllers 300A and 300B, and wired controller 350 can be used as controller(s) of information processing device 100. In the description below, "use as controller(s) of information processing device 100" primarily intends a device, means, or a function for accepting an input operation by a user and effectively outputting operation information representing the input operation to information processing device 100.

A display device 4 such as a television receiver for household use is connected to information processing device 100. Information processing device 100 is an entity performing various types of processing in information processing system 1, and executes an application installed in advance and outputs video images or audio sound generated as a result of execution thereof to display device 4. A menu screen mounted in advance on information processing device 100 is also output to display device 4. An application executed in information processing device 100 is typically distributed through such an optical storage medium 8 as a digital versatile disk (DVD).

Data is exchanged through wireless communication between information processing device 100 and portable terminal 200 and between information processing device 100 and wireless controllers 300A and 300B. For such wireless communication, for example, wireless LAN in compliance with IEEE802.11n specifications, a scheme in compliance with specifications of Bluetooth (trademark), or infrared communication in compliance with infrared data association (IRDA) specifications is employed.

[a2: Information Processing Device 100]

Figure 2:
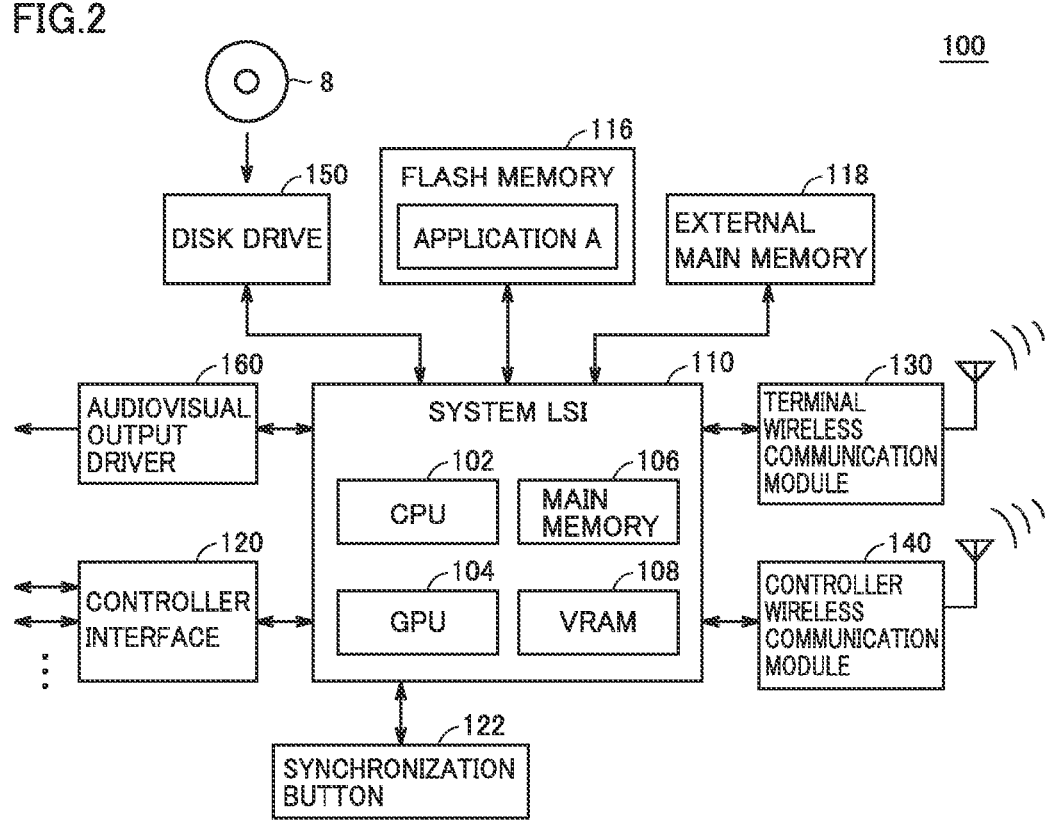
FIG. 2 shows an exemplary illustrative non-limiting schematic diagram illustrating a configuration example of an information processing device included in the information processing system according to the present embodiment.

Referring to FIG. 2, information processing device 100 is a computer including a system large scale integration (LSI) 110, a flash memory 116, an external memory 118, a controller interface 120, a synchronization button 122, a terminal wireless communication module 130, a controller wireless communication module 140, a disk drive 150, and an audiovisual output driver 160.

System LSI 110 is a processing engine in information processing device 100, and includes a central processing unit (CPU) 102, a graphical processing unit (GPU) 104, a main memory 106, and a video random access memory (VRAM) 108. CPU 102 executes a basic system program or an application. GPU 104 performs processing mainly in connection with display. Main memory 106 functions as a working memory holding temporary data necessary for execution of a program in CPU 102. VRAM 108 functions as a working memory for displaying an image generated through processing in GPU 104. All components included in system LSI 110 do not have to be mounted on a single LSI, and some of them may be mounted outside the LSI.

Flash memory 116 can be accessed from system LSI 110 and holds a basic system program or an application in a non-volatile manner. For example, flash memory 116 stores an application A which will be described later. External memory 118 functions as a working memory in coordination with main memory 106 in system LSI 110.

Controller interface 120 includes a connector and a circuit for connection of wired controller 350 (see FIG. 1) through a wire. Controller interface 120 exchanges a signal indicating an input operation onto wired controller 350 (operation information) with wired controller 350.

Synchronization button 122 represents one type of operation devices, and is used for establishing wireless connection to wireless controller 300 as will be described later.

Terminal wireless communication module 130 includes various circuits for wireless communication with portable terminal 200 (see FIG. 1). Namely, terminal wireless communication module 130 corresponds to a module for wireless connection to at least one portable terminal 200 having a wireless communication function.

Controller wireless communication module 140 includes various circuits for wireless communication with wireless controllers 300A and 300B (see FIG. 1). Namely, controller wireless communication module 140 corresponds to a module for wireless connection to at least one wireless controller 300A, 300B.

A configuration in accordance with each communication scheme is adopted for these communication modules. Such a configuration that these communication modules are physically integrated in the entirety or in part can also be adopted.

Disk drive 150 reads data from optical storage medium 8 and outputs the read data to system LSI 110. Audiovisual output driver 160 outputs a video signal and an audio signal output from system LSI 110 to display device 4.

[a3: Portable Terminal 200]

Figure 3:
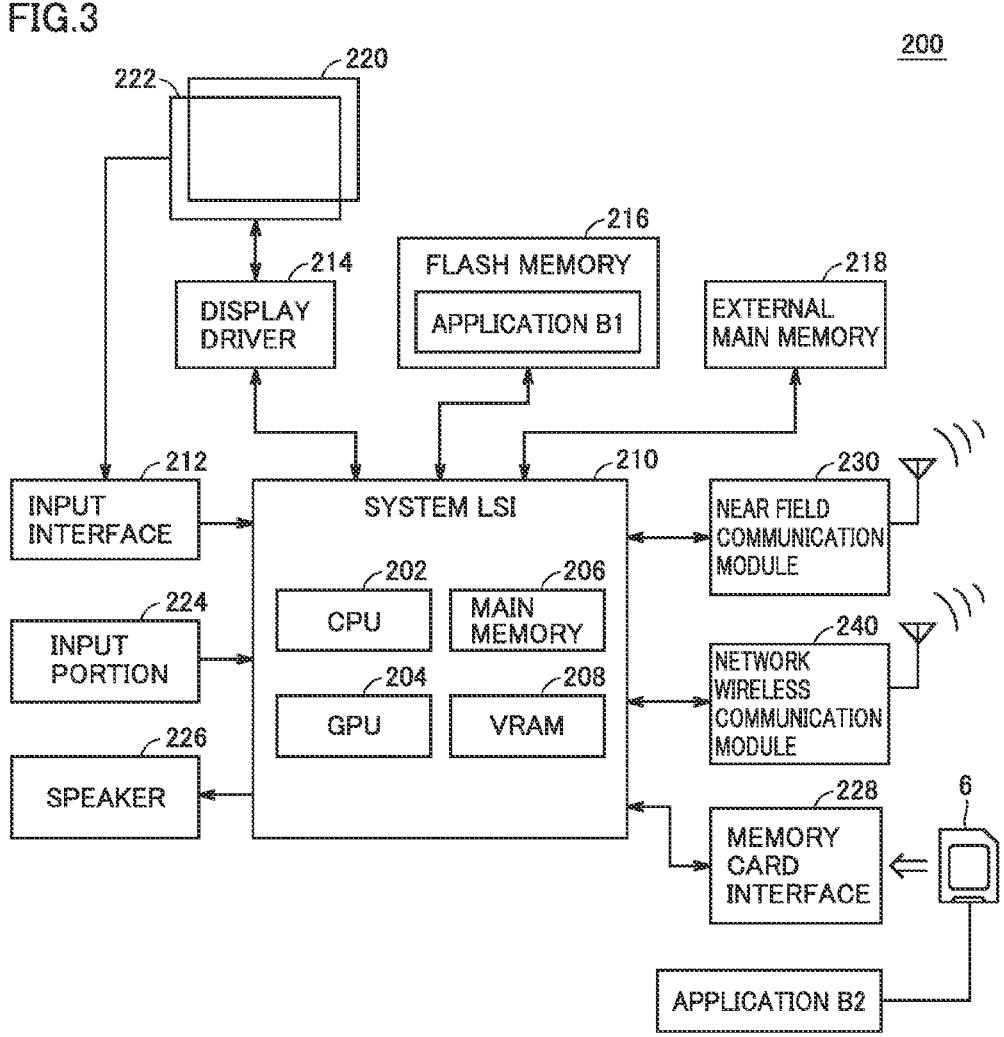
FIG. 3 shows an exemplary illustrative non-limiting schematic diagram illustrating a configuration example of a portable terminal included in the information processing system according to the present embodiment.

Referring to FIG. 3, portable terminal 200 can execute any application alone and display a result of execution thereof, and has a wireless communication function. More specifically, portable terminal 200 is a computer including a system LSI 210, an input interface 212, a display driver 214, a flash memory 216, an external memory 218, a display 220, a touch panel 222, an input portion 224, a speaker 226, a memory card interface 228, a near field communication module 230, and a network wireless communication module 240.

System LSI 210 is a processing engine in portable terminal 200, and includes a CPU 202, a GPU 204, a main memory 206, and a VRAM 208. Since these components are the same as the components of system LSI 110 of information processing device 100 shown in FIG. 2, detailed description will not be repeated. All components included in system LSI 210 do not have to be mounted on a single LSI, and some of them may be mounted outside the LSI.

Display driver 214 drives display 220 in accordance with a rendering instruction output from system LSI 210. Touch panel 222 is provided on a surface of display 220 and accepts an input operation by a user. Input interface 212 outputs operation information representing an input operation detected by touch panel 222 to system LSI 210.

Flash memory 216 holds a basic system program or an application in a non-volatile manner. For example, flash memory 216 stores an application B1 which will be described later. External memory 218 functions as a working memory in coordination with main memory 206 within system LSI 210.

Input portion 224 includes such an operation device as a hard key or a button provided on a surface of portable terminal 200, and outputs operation information representing an input operation by a user to system LSI 210. Namely, a plurality of types of keys accepting an input operation are provided in portable terminal 200. Speaker 226 outputs sound effect in response to an audio instruction output from system LSI 210.

Memory card interface 228 is configured such that a memory card 6 can be attached thereto, and reads data stored in memory card 6 and writes data into memory card 6. For example, memory card 6 stores an application B2 which will be described later.

Near field communication module 230 includes various circuits for wireless communication with information processing device 100 (see FIG. 1). Network wireless communication module 240 includes various circuits for wireless communication with a not-shown access point. A configuration in accordance with each communication scheme is adopted for these communication modules. Such a configuration that these communication modules are physically integrated in the entirety or in part can also be adopted.

[a4: Wireless Controllers 300A and 300B]

Figure 4:
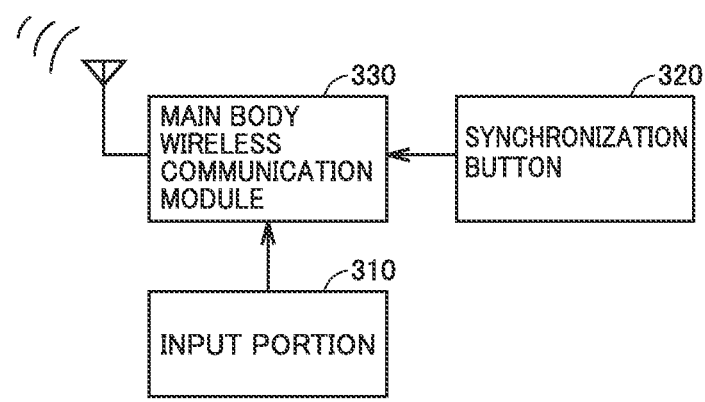
FIG. 4 shows an exemplary illustrative non-limiting schematic diagram illustrating a configuration example of a wireless controller included in the information processing system according to the present embodiment.

Referring to FIG. 4, wireless controllers 300A and 300B (hereinafter collectively referred to as a "wireless controller 300") can wirelessly be connected to information processing device 100. More specifically, wireless controller 300 includes an input portion 310, a synchronization button 320, and a main body wireless communication module 330.

Input portion 310 includes such an operation device as a hard key or a button provided on a surface of wireless controller 300 and outputs operation information representing an input operation by a user to main body wireless communication module 330. Synchronization button 320 represents one type of operation devices, and outputs operation information representing an operation by a user to main body wireless communication module 330. As will be described later, synchronization button 320 is used in order for wireless controller 300 to trigger start of wireless connection to information processing device 100 (see FIG. 1).

Main body wireless communication module 330 includes various circuits for wireless communication with information processing device 100 (see FIG. 1). A configuration in accordance with each communication scheme is adopted for main body wireless communication module 330. Such a configuration that these communication modules are physically integrated in the entirety or in part can also be adopted.

[a5: Wired Controller 350]

Wired controller 350 corresponds to a component including a communication interface for connection through a wire to controller interface 120 (see FIG. 2) of information processing device 100, instead of synchronization button 320 and main body wireless communication module 330 in the configuration example of wireless controller 300 shown in FIG. 4. Therefore, detailed description will not be repeated.

B. Overview of Processing in Wireless Connection

Figure 5:
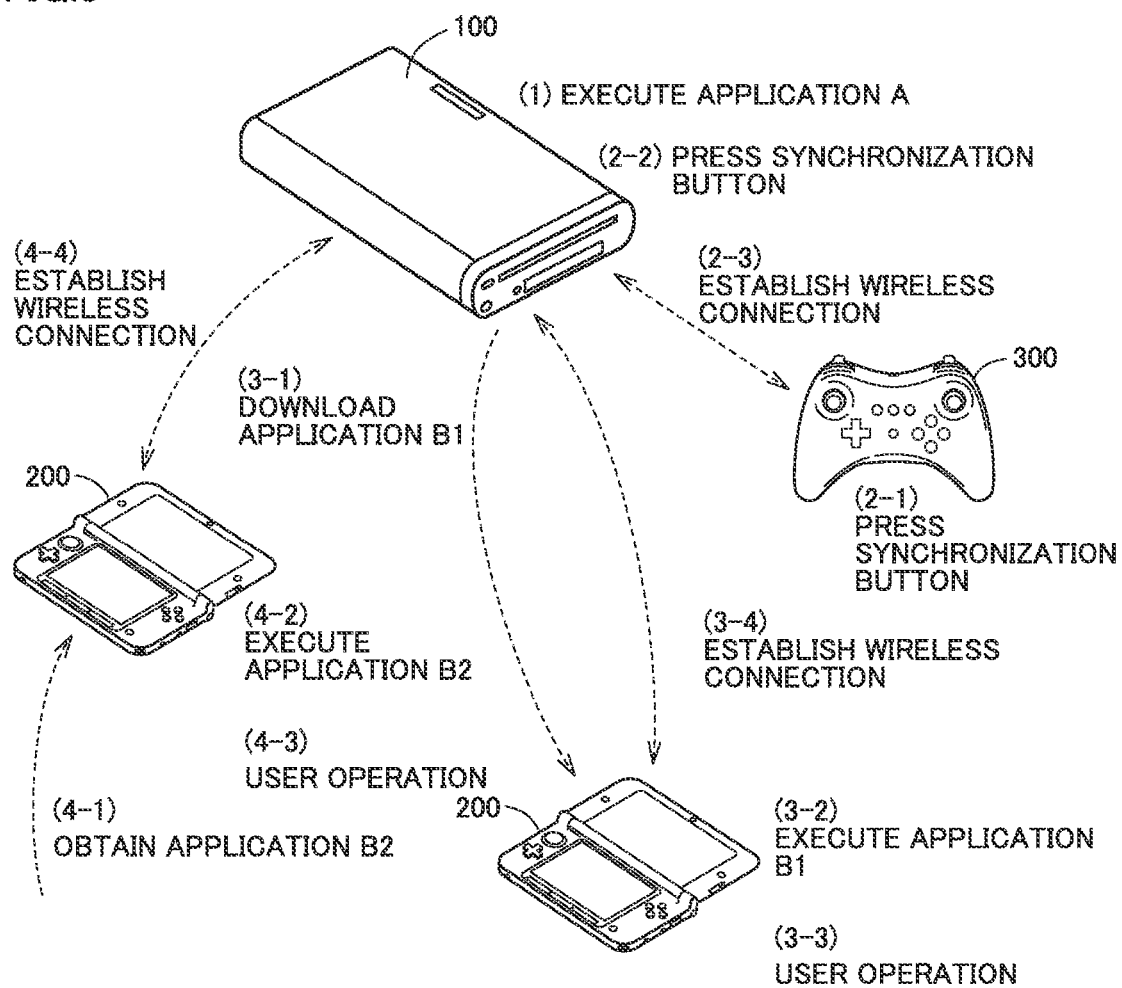
FIG. 5 shows an exemplary illustrative non-limiting schematic diagram illustrating overview of processing for wireless connection in the information processing system according to the present embodiment.

Referring to FIG. 5, overview of processing for wireless connection of portable terminal 200 and wireless controller 300 will be described. A case that information processing device 100 executes any application (hereinafter also referred to as an "application A") (a step (1) in FIG. 5) and at least one of portable terminal 200 and wireless controller 300 is used as a controller in this application A will be considered.

Initially, a procedure for wireless connection of wireless controller 300 to information processing device 100 will be described. A user presses synchronization button 320 (see FIG. 4) of wireless controller 300 (a step (2-1) in FIG. 5). Concurrently, the user presses synchronization button 122 (see FIG. 2) of information processing device 100 (a step (2-2) in FIG. 5). As the synchronization buttons are pressed in respective devices, pairing processing is started. When this pairing processing is successful, wireless connection between information processing device 100 and wireless controller 300 is established (a step (2-3) in FIG. 5).

Timing of pressing of synchronization button 320 of wireless controller 300 may be earlier or later than timing of pressing of synchronization button 122 of information processing device 100. Regardless of execution of application A, wireless connection can also be established between information processing device 100 and wireless controller 300.

Thus, wireless controller 300 is configured to wirelessly be connected to information processing device 100 in accordance with a first procedure and transmit operation information representing an input operation onto wireless controller 300 to information processing device 100. In other words, controller wireless communication module 140 of information processing device 100 is configured to wirelessly be connected to wireless controller 300 in accordance with the first procedure and receive operation information representing an input operation onto wireless controller 300. Namely, in information processing system 1, a step in which information processing device 100 establishes wireless connection to wireless controller 300 in accordance with the first procedure and receives operation information representing an input operation onto wireless controller 300 is performed.

(Two types of) procedures for wireless connection of portable terminal 200 to information processing device 100 will now be described.

In a first method, an application mainly including a driver program associated with wireless connection (hereinafter also referred to as an "application B1") is downloaded from information processing device 100 to portable terminal 200, and portable terminal 200 establishes wireless connection to information processing device 100 by executing application B1. More specifically, a user operates a controller of information processing device 100 activated in advance and downloads application B1 from information processing device 100 to portable terminal 200 (a step (3-1) in FIG. 5). Portable terminal 200 executes application B1 (a step (3-2) in FIG. 5). When the user performs an input operation in an operation screen provided as a result of execution of application B1 (a step (3-3) in FIG. 5), wireless connection is established between information processing device 100 and portable terminal 200 (a step (3-4) in FIG. 5).

Application B1 may be independent of application A or may be included in application A.

In a second method, an application including a content the same as in application A (hereinafter also referred to as an "application B2") is obtained from a source other than information processing device 100, and portable terminal 200 establishes wireless connection to information processing device 100 by executing application B2. More specifically, the user obtains application B2 through a storage medium or by downloading from a download site (a step (4-1) in FIG. 5). Portable terminal 200 executes application B2 (a step (4-2) in FIG. 5). When the user performs an input operation in an operation screen provided as a result of execution of application B2 (a step (4-3) in FIG. 5), wireless connection is established between information processing device 100 and portable terminal 200 (a step (4-4) in FIG. 5).

In the present embodiment, application A and application B2 are in association with each other. For example, application A and application B2 are in association with each other in that they are directed to a game of the same type but they are different in model with which the application is compatible or in version, they are part of a series, or one of them is a sequel of the other.

Thus, portable terminal 200 is configured to wirelessly be connected to information processing device 100 in accordance with a second procedure different from the first procedure (a procedure for connection between wireless controller 300 and information processing device 100) and transmit operation information representing an input operation onto portable terminal 200 to information processing device 100. In other words, terminal wireless communication module 130 of information processing device 100 is configured to wirelessly be connected to portable terminal 200 in accordance with the second procedure and receive operation information representing an input operation onto portable terminal 200. Namely, in information processing system 1, a step in which information processing device 100 establishes wireless connection to portable terminal 200 in accordance with the second procedure different from the first procedure and receives second operation information representing an input operation onto portable terminal 200 is performed.

Here, as shown in FIG. 5, the second procedure (the procedure for connection between portable terminal 200 and information processing device 100) includes more procedures (operations) than the first procedure (the procedure for connection between wireless controller 300 and information processing device 100).

The procedure for such processing for wireless connection will be described below in detail.

C. Processing for Wireless Connection of Wireless Controller 300

Though information processing device 100 may establish wireless connection to all wireless controllers 300 in accordance with the steps (2-1) to (2-3) in FIG. 5, from a point of view of convenience of a user, information processing device 100 may be configured to automatically establish wireless connection to a predetermined number (a default number) of wireless controllers 300. Then, while application A is running in information processing device 100, wireless controllers 300 in number exceeding the predetermined number may be connected. For connection of wireless controllers 300 in number exceeding the predetermined number, the procedure shown in the steps (2-1) to (2-3) in FIG. 5 is performed.

FIG. 6 shows processing for establishing wireless connection between information processing device 100 and a plurality of wireless controllers 300-1, 300-2, and 300-3.

Information processing device 100 secures four input I/O areas 170 in the system memory such that operation information can be received from each of four wireless controllers 300 while application A is not running, that is, while only a menu application or a launcher application is running. Information processing device 100 secures an additional input I/O area 172 in a storage memory such that operation information can be received from more than four wireless controllers 300 as information processing device 100 executes application A.

Referring to FIG. 6, when power of information processing device 100 is turned on (sequence SQ2), information processing device 100 starts transmission of a wireless signal (a beacon) through controller wireless communication module 140 (see FIG. 2). Wireless controller 300-1 and wireless controller 300-2 each receive the wireless signal from information processing device 100, and establish wireless connection to information processing device 100 (sequences SQ4 and SQ6). Operation information representing input operations by the users onto wireless controllers 300-1 and 300-2 is stored in input I/O area 170 (for example, input I/O_1 and input I/O_2).

Thereafter, it is assumed that execution of application A in information processing device 100 is started in response to an operation by the user (sequence SQ10). Thereafter, the user presses synchronization button 320 of wireless controller 300-3 (sequence SQ12) and the user presses synchronization button 122 of information processing device 100 (sequence SQ14). Then, both of information processing device 100 and wireless controller 300-3 start transmission of wireless signals (beacons) including identification information indicating the device or the wireless controller itself, and wireless controller 300-3 establishes wireless connection to information processing device 100 through prescribed negotiation (sequence SQ16).

Thus, as synchronization button 122 of information processing device 100 and synchronization button 320 of wireless controller 300 are pressed, the first procedure (the procedure for connection between wireless controller 300 and information processing device 100) is started. Even though application A is not being executed, the first procedure may be started. Namely, the first procedure may be executable at any time. Namely, so long as power of information processing device 100 has been turned on, the first procedure (the procedure for connection between wireless controller 300 and information processing device 100) can be started. Here, the first procedure includes an input operation onto wireless controller 300 (pressing of synchronization button 320).

D. Processing for Wireless Connection of Portable Terminal 200

A method of establishing wireless connection between information processing device 100 and portable terminal 200 in accordance with the steps (3-1) to (3-4) in FIG. 5 (the first method) and a method of establishing wireless connection between information processing device 100 and portable terminal 200 in accordance with the steps (4-1) to (4-4) in FIG. 5 (the second method) will be described below in detail.

(d1: Processing for Wireless Connection of Portable Terminal 200 (First Method))

FIG. 7 shows processing for portable terminal 200 to obtain application B1 from information processing device 100 and establish wireless connection by executing obtained application B1. As in the configuration shown in FIG. 6, additional input I/O area 172 is secured in the storage memory of information processing device 100 such that operation information from portable terminal 200 can be received.

Figure 8A:
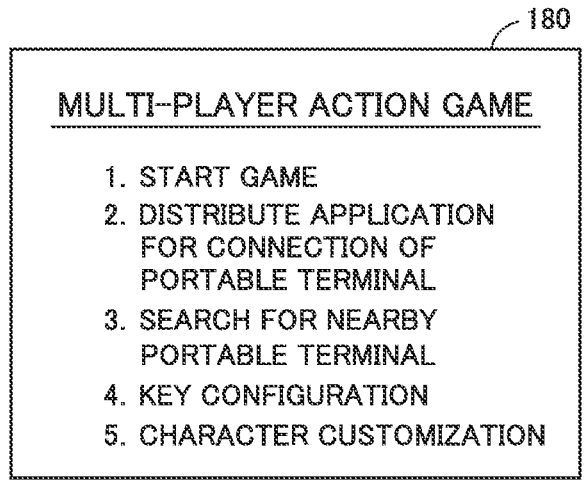
FIGS. 8A to 8C show exemplary illustrative non-limiting diagrams illustrating an example of transition of screens displayed on the information processing device in the procedure for establishing wireless connection shown in FIG. 7.

Referring to FIG. 7, it is assumed that after power of information processing device 100 is turned on (sequence SQ2), execution of application A is started in information processing device 100 in response to an operation by the user (sequence SQ10). As a result of execution of application A, display device 4 connected to information processing device 100 displays a menu screen 180 shown in FIG. 8A.

Figure 8B:
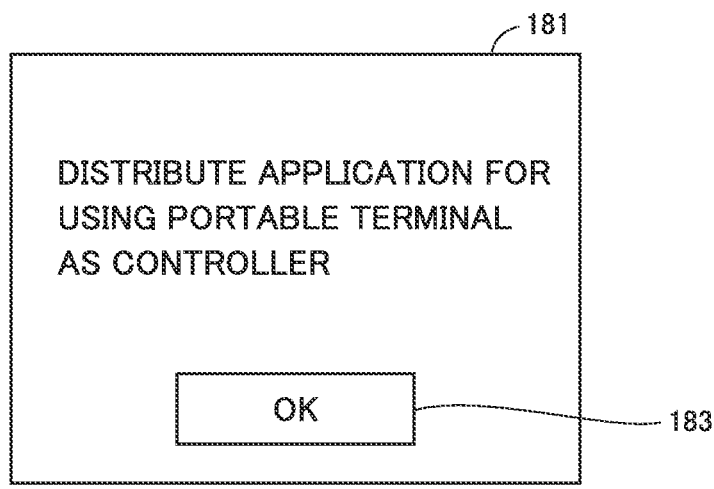
Figure 8C:
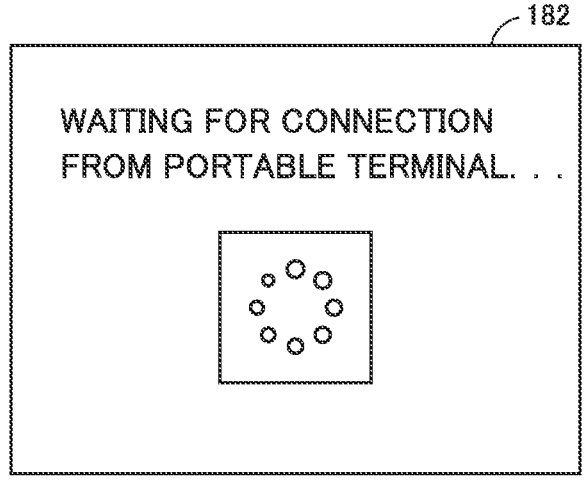

The user performs an operation onto information processing device 100 (sequence SQ20). More specifically, the user selects "2. distribute application for connection of portable terminal" in menu screen 180 shown FIG. 8A. Then, menu screen 180 makes transition to a check screen 181 shown in FIG. 8B. When the user selects an OK button 183 in check screen 181 shown in FIG. 8B, downloading (distribution) of application B1 from information processing device 100 to portable terminal 200 is started (sequence SQ22). When downloading of application B1 is completed, information processing device 100 enters a state of waiting for a request for wireless connection from any portable terminal 200. Typically, a stand-by screen 182 shown in FIG. 8C is displayed.

Figure 9A:
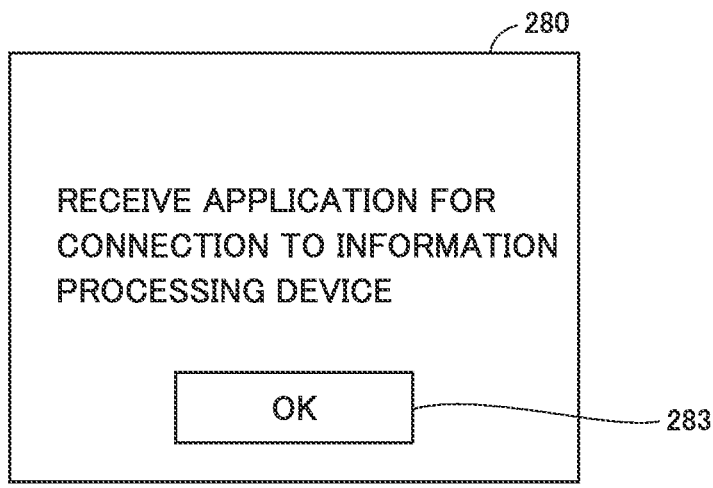
FIGS. 9A to 9C show exemplary illustrative non-limiting diagrams illustrating an example of transition of screens displayed on the portable terminal in the procedure for establishing wireless connection shown in FIG. 7.
Figure 9B:
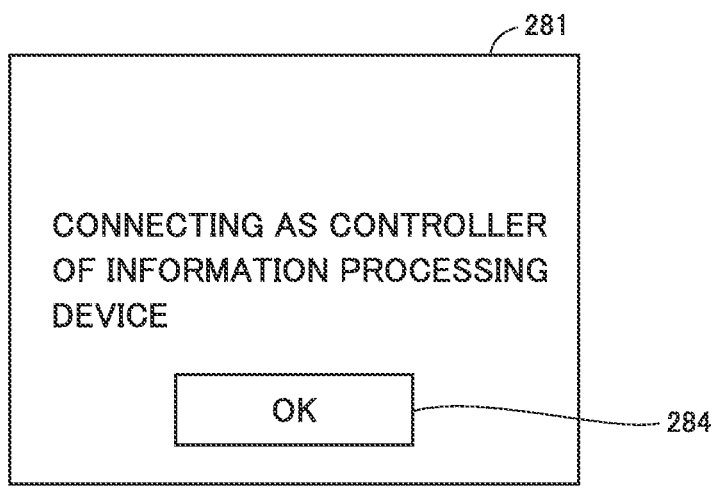
Figure 9C:
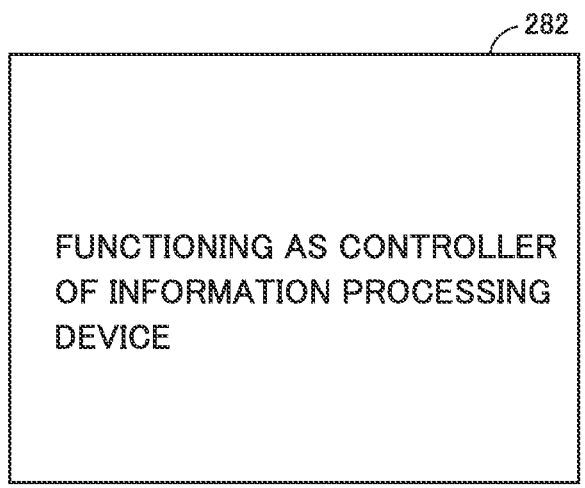

Concurrently, the user performs an operation for receiving application B1 also onto portable terminal 200 (sequence SQ24). More specifically, when the user performs an operation of interest on a menu screen (not shown) of portable terminal 200, a check screen 280 shown in FIG. 9A is displayed. When the user selects an OK button 283 in check screen 280 shown in FIG. 9A, portable terminal 200 enters a state of waiting for application B1 distributed from information processing device 100. After downloading of application B1 is completed, portable terminal 200 executes application B1 (sequence SQ26). Then, a check screen 281 shown in FIG. 9B is displayed on display 220 of portable terminal 200. When the user performs an operation onto portable terminal 200 (sequence SQ28), portable terminal 200 transmits a request for wireless connection to information processing device 100. Namely, when the user selects an OK button 284 in check screen 281 shown in FIG. 9B, prescribed negotiation for establishing wireless connection is started. When this negotiation is successful, portable terminal 200 establishes wireless connection to information processing device 100 (sequence SQ30). Then, a status display screen 282 shown in FIG. 9C is displayed on display 220 of portable terminal 200, and a notification of a state that portable terminal 200 is functioning as a controller of information processing device 100 is given.

In the first method described above, application B1 is provided from information processing device 100 to portable terminal 200. Namely, portable terminal 200 obtains application B1 from information processing device 100. Through such a series of processes, portable terminal 200 establishes wireless connection to information processing device 100.

(d2: Processing for Wireless Connection of Portable Terminal 200 (Second Method))

FIG. 10 shows processing for portable terminal 200 to obtain application B2 from a source different from information processing device 100 and establish wireless connection by executing obtained application B2. As in the configuration shown in FIG. 6, additional input I/O area 172 is secured in the storage memory of information processing device 100 such that operation information from portable terminal 200 can be received.

Figure 11A:
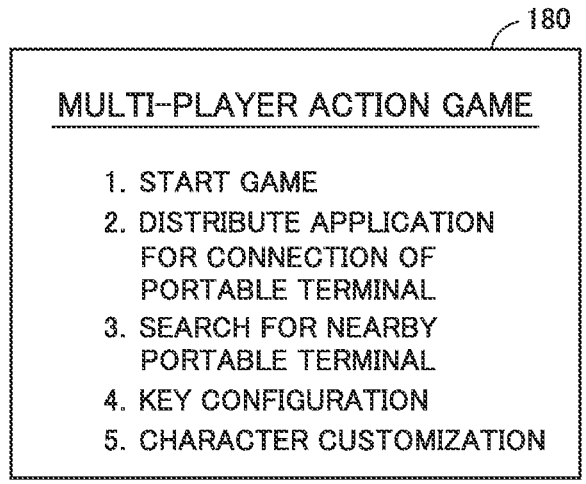
FIGS. 11A and 11B show exemplary illustrative non-limiting diagrams illustrating an example of transition of screens displayed on the information processing device in the procedure for establishing wireless connection shown in FIG. 10.

Referring to FIG. 10, it is assumed that after power of information processing device 100 is turned on (sequence SQ2), execution of application A is started in information processing device 100 in response to an operation by the user (sequence SQ10). As a result of execution of application A, menu screen 180 shown in FIG. 11A is displayed on display device 4 connected to information processing device 100.

Figure 11B:
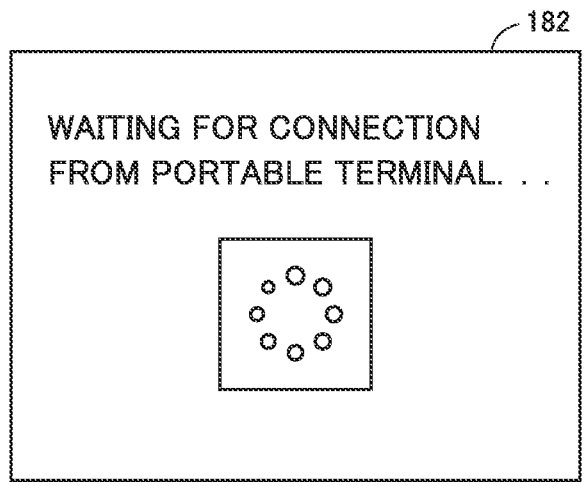

The user performs an operation onto information processing device 100 (sequence SQ20). More specifically, the user selects "3. search for nearby portable terminal" in menu screen 180 shown in FIG. 11A. Then, information processing device 100 enters a state of waiting for a request for wireless connection from any portable terminal 200. Typically, stand-by screen 182 shown in FIG. 11B is displayed.

The user obtains application B2 to be executed in portable terminal 200. Typically, the user purchases application B2 distributed as being stored in any storage medium and attaches the storage medium to portable terminal 200 (sequence SQ21). Alternatively, the user accesses a download site through portable terminal 200 and purchases application B2 from the download site (sequence SQ23). Application B2 purchased from the download site is stored in flash memory 216 (see FIG. 3) of portable terminal 200.

Figure 12A:
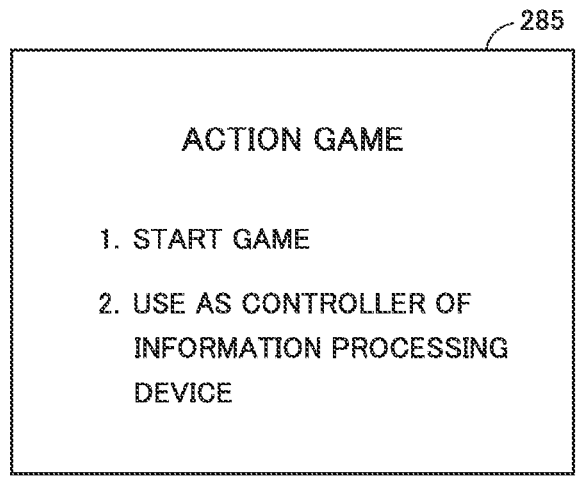
FIGS. 12A to 12C show exemplary illustrative non-limiting diagrams illustrating an example of transition of screens displayed on the portable terminal in the procedure for establishing wireless connection shown in FIG. 10.
Figure 12B:
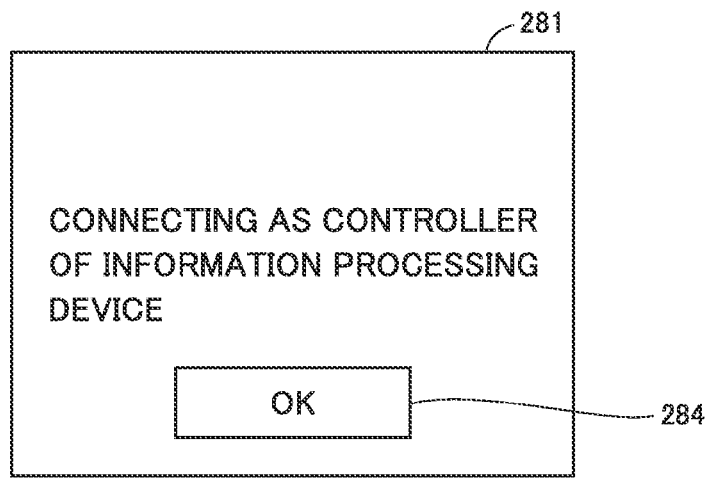
Figure 12C:
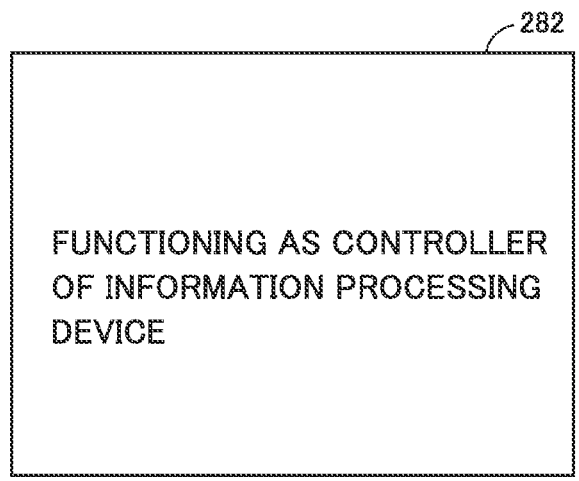

The user performs an operation onto portable terminal 200 (sequence SQ25), and executes application B2 in portable terminal 200 (sequence SQ27). As application B2 is running, a menu screen 285 shown in FIG. 12A is displayed on display 220 of portable terminal 200. When the user performs an operation onto portable terminal 200 (sequence SQ29), portable terminal 200 transmits a request for wireless connection to information processing device 100. Namely, when the user selects "2. use as controller of information processing device" in menu screen 285 shown in FIG. 12A, menu screen 285 makes transition to check screen 281 shown in FIG. 12B. When the user selects OK button 284 in check screen 281 shown in FIG. 12B, prescribed negotiation for establishing wireless connection is started. When this negotiation is successful, portable terminal 200 establishes wireless connection to information processing device 100 (sequence SQ30). Then, status display screen 282 shown in FIG. 12C is displayed on display 220 of portable terminal 200, and a notification of a state that portable terminal 200 is functioning as a controller of information processing device 100 is given.

In the second method described above, portable terminal 200 obtains application B2 from a medium or a device different from information processing device 100. Through such a series of processes, portable terminal 200 establishes wireless connection to information processing device 100.

(d3: Summary of Processing for Wireless Connection of Portable Terminal 200)

Wireless connection between information processing device 100 and portable terminal 200 is established only when application B1 or B2 including a driver program associated with wireless connection to information processing device 100 is being executed. Namely, the second procedure (the procedure for connection between portable terminal 200 and information processing device 100) is executable when information processing device 100 is in a prescribed state. Here, the second procedure includes an input operation for executing application B1 or B2 in portable terminal 200 and an input operation onto portable terminal 200 while application B1 or B2 is being executed.

Figure 13:
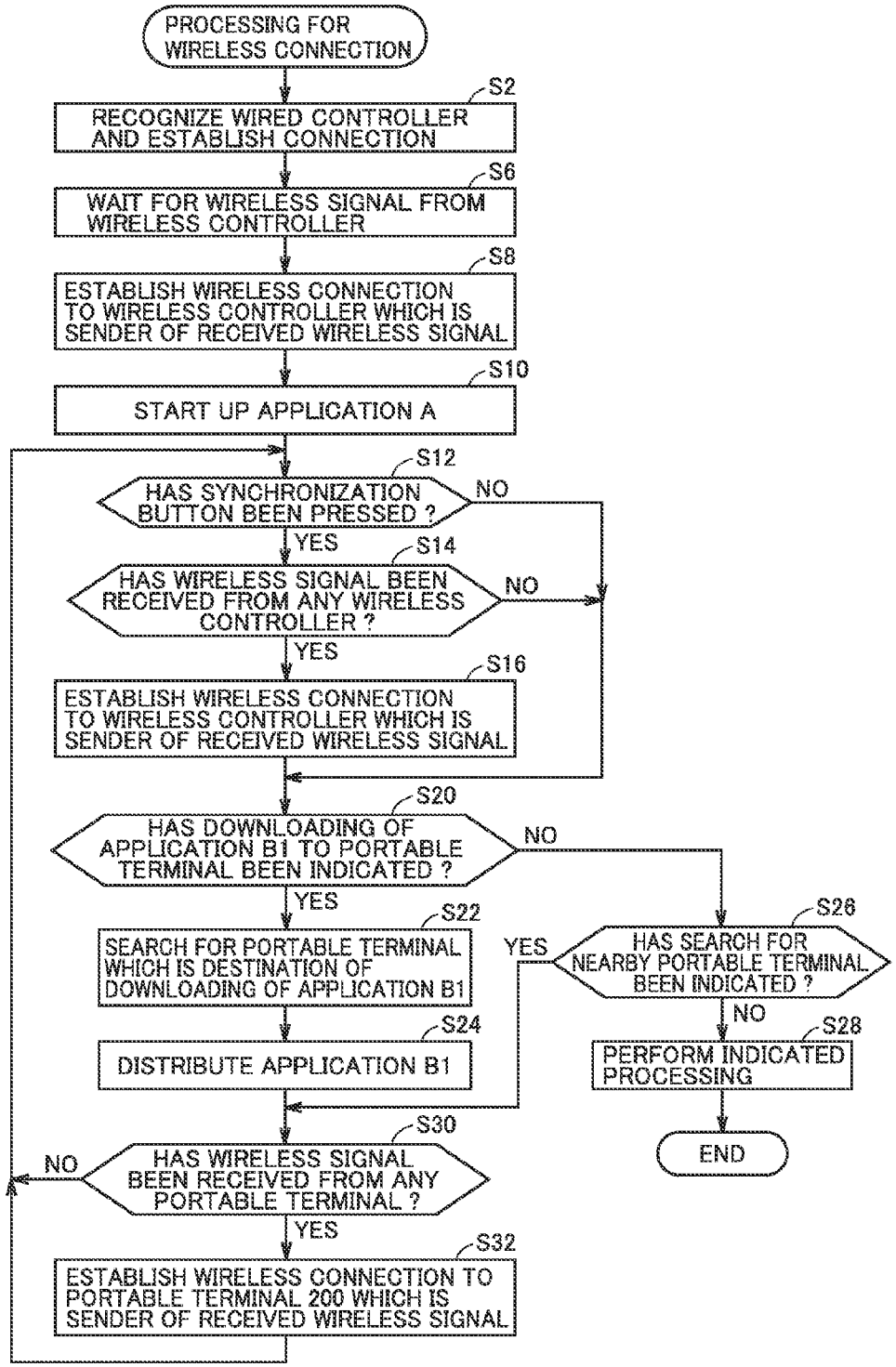
FIG. 13 shows an exemplary illustrative non-limiting flowchart illustrating a processing procedure in connection with processing for wireless connection performed in the information processing device in the present embodiment.

E. Processing Procedure in Connection with Processing for Wireless Connection FIG. 13 shows a processing procedure in connection with processing for wireless connection performed in information processing device 100 in the present embodiment. Each step shown in FIG. 13 is implemented as system LSI 110 (or a processor) of information processing device 100 executes a basic system program or application A.

Referring to FIG. 13, when power is turned on, information processing device 100 recognizes wired controller 350 connected through a wire and establishes connection (step S2). Here, a memory area for accepting operation information representing an input operation onto wired controller 350 is set. In succession, information processing device 100 starts transmission of a wireless signal (a beacon) and waits for wireless signal(s) from one wireless controller 300 or a plurality of wireless controllers 300 (step S6). Information processing device 100 establishes wireless connection to wireless controller 300 which is a sender of the received wireless signal (step S8). Thereafter, in response to an operation by the user, information processing device 100 starts up application A (step S10).

When application A is started up, information processing device 100 determines whether or not synchronization button 122 has been pressed (step S12). When synchronization button 122 has not been pressed (NO in step S12), the process proceeds to step S20.

When synchronization button 122 has been pressed (YES in step S12), transmission of a wireless signal (a beacon) is started and whether or not a wireless signal has been received from any wireless controller 300 is determined (step S14). When a wireless signal has been received from any wireless controller 300 (YES in step S14), information processing device 100 establishes wireless connection to wireless controller 300 which is the sender of the received wireless signal (step S16). As synchronization button 320 is pressed, wireless controller 300 starts transmission of a wireless signal for wireless connection. When a wireless signal has not been received from any wireless controller 300 (NO in step S14), processing for wireless connection to wireless controller 300 is stopped and the process proceeds to step S20. Typically, when a period during which no wireless signal is received exceeds a predetermined time period, it is determined in step S14 that a wireless signal was not received from any wireless controller 300.

In succession, information processing device 100 determines whether or not downloading (distribution) of application B1 to portable terminal 200 has been indicated (step S20). When downloading of application B1 to portable terminal 200 has been indicated (YES in step S20), information processing device 100 searches for portable terminal 200 which is a destination of downloading of application B1 (step S22), and distributes application B1 to found portable terminal 200 (step S24). Then, processing in step S30 and subsequent steps is performed.

In contrast, when downloading of application B1 to portable terminal 200 has not been indicated (NO in step S20), information processing device 100 determines whether or not search for nearby terminal device 200 has been indicated (step S26). When search for nearby portable terminal 200 has been indicated (YES in step S26), the processing in step S30 and subsequent steps is performed.

When search for nearby portable terminal 200 has not been indicated (NO in step S26), information processing device 100 performs indicated processing (step S28).

In step S30, information processing device 100 starts transmission of a wireless signal (a beacon) and determines whether or not a wireless signal has been received from any portable terminal 200 (step S30). When a wireless signal has been received from any portable terminal 200 (YES in step S30), information processing device 100 establishes wireless connection to portable terminal 200 which is the sender of the received wireless signal (step S32). Then, the processing in step S12 and subsequent steps is again performed. In contrast, when a wireless signal has not been received from any portable terminal 200 (NO in step S30), processing for wireless connection to portable terminal 200 is stopped and the processing in step S12 and subsequent steps is again performed.

F. Selection of Object in Application

One example of a form of use of a controller (wirelessly connected portable terminal 200 and wireless controller 300, as well as wired controller 350) in application A executed in information processing device 100 will now be described.

As application A, for example, such a game that a plurality of users select respective characters and the users simultaneously operate the selected characters for fun is assumed. Such processing that each user selects a character to be operated in application A will be described. Though a character is described by way of example as an object used in application A in the description below, an object is not limited to a character and various types of selectable data, images, and voice and sound can be employed.

Figure 14:
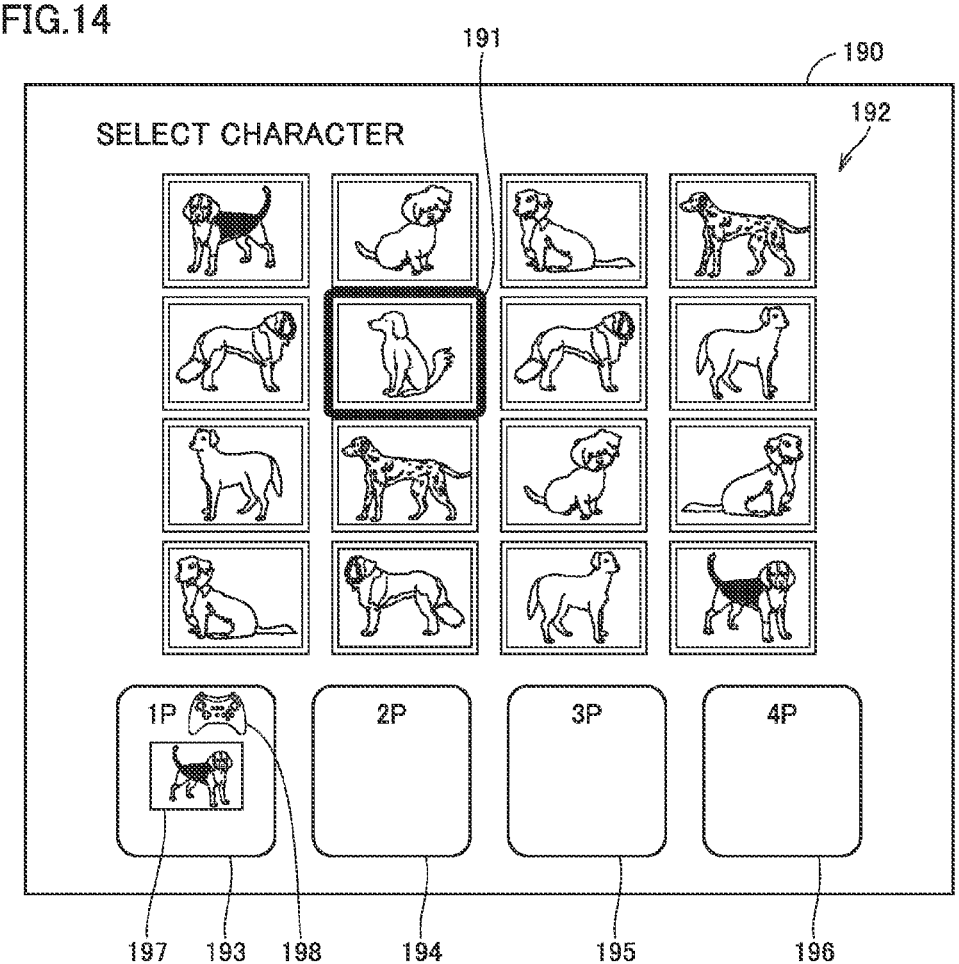
FIG. 14 shows an exemplary illustrative non-limiting diagram illustrating one example of a character selection screen provided as a result of execution of an application A by the information processing device according to the present embodiment.

FIG. 14 shows one example of a character selection screen provided as a result of execution of application A by information processing device 100 in the present embodiment. A character selection screen 190 shown in FIG. 14 is displayed, for example, when the user selects "1. start game" in menu screen 180 shown in FIG. 8A or 11A.

In character selection screen 190 shown in FIG. 14, four users from a first player (1P) to a fourth player (4P) can simultaneously play. As described above, portable terminal 200, wireless controller 300, and wired controller 350 can be connected to information processing device 100, and the number of terminals and/or controllers which can be connected is greater than the number of users who can simultaneously play (in this example, four). Namely, the total number of wireless controllers 300 and portable terminals 200 which can wirelessly be connected to information processing device 100 is greater than the number of controllers used in application A.

One example of a method of selecting a terminal and/or a controller to actually be used as an active controller in application A will be described below.

Characters are displayed in a list in character selection screen 190 (an area 192), and the user selects a character to be used by operating any controller and moving a selection frame 191. In character selection screen 190, display frames 193 to 196 displaying respective selected characters are provided for 1P to 4P.

By way of example, an example in which a character and a controller to be used are selected in the order from 1P to 4P is shown. FIG. 14 shows that a character to be used by 1P has already been selected and wireless controller 300A is designated as a controller for operating the character. Namely, in display frame 193, an icon image 197 showing the selected character and an icon image 198 showing a controller to be used are displayed.

When a character and a controller to be used are selected in the order from 1P to 4P, an active controller may be determined on the first-come, first-served basis. Namely, among portable terminal 200, wireless controller 300, and wired controller 350 which are effectively connected to information processing device 100, a terminal and/or a controller onto which a user has performed some kind of input operation while character selection screen 190 is displayed is/are successively activated as controller(s). Thus, information processing device 100 executes application A and activates as controller(s) to be used in application A, a terminal and/or a controller onto which a prescribed input operation has been performed while application A provides display of a prescribed screen, among wireless controller(s) 300 and portable terminal(s) 200 which are wirelessly connected to information processing device 100.

In the example shown in FIG. 14, the user has performed an input operation earliest onto wireless controller 300A connected to information processing device 100. Therefore, wireless controller 300A has been selected as an active controller. Thus, information processing device 100 activates successively as controllers, a terminal and/or a controller onto which a prescribed input operation has been performed, among wireless controller(s) 300 and portable terminal(s) 200 which are wirelessly connected to information processing device 100, until the number of the activated terminals and/or controllers reaches a prescribed number.

Figure 15:
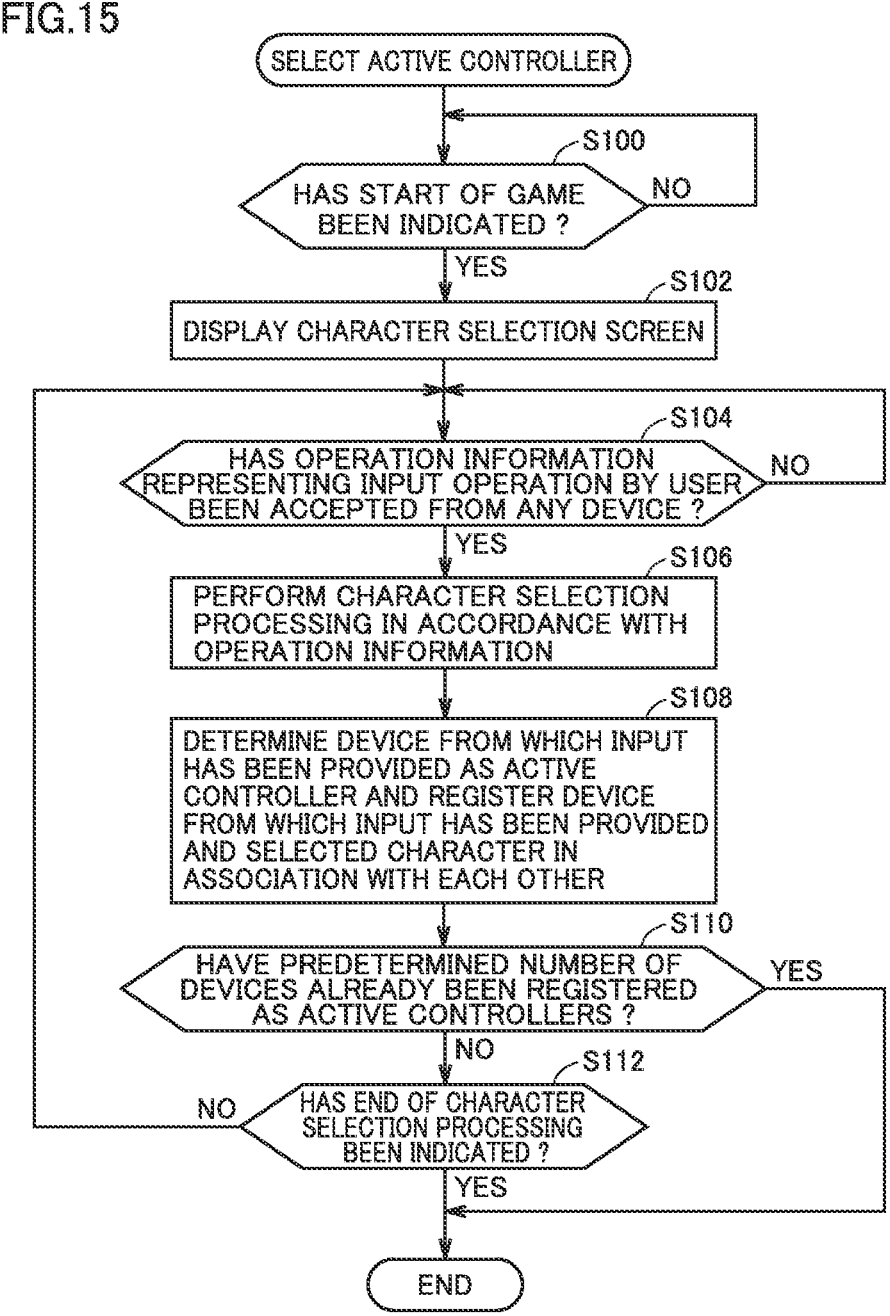
FIG. 15 shows an exemplary illustrative non-limiting flowchart illustrating a processing procedure in connection with selection of an active controller performed in the information processing device according to the present embodiment.

FIG. 15 shows a processing procedure in connection with selection of an active controller performed in information processing device 100 in the present embodiment. Each step shown in FIG. 15 is implemented as system LSI 110 (or a processor) of information processing device 100 executes application A.

Referring to FIG. 15, information processing device 100 determines whether or not start of the game has been indicated (step S100). When start of the game has not been indicated (NO in step S100), information processing device 100 repeats the processing in step S100.

When start of the game is indicated (YES in step S100), information processing device 100 displays character selection screen 190 (see FIG. 14). In succession, information processing device 100 determines whether or not operation information indicating an input operation by a user has been accepted from any device of portable terminal 200, wireless controller 300, and wired controller 350 which are connected (step S104). When operation information indicating an input operation by the user has not been accepted from any device (NO in step S104), information processing device 100 repeats the processing in step S104.

When operation information indicating an input operation by the user has been accepted from any device (YES in step S104), information processing device 100 performs processing for selecting a character in accordance with the operation information (step S106). When the user finally makes decision on a character, information processing device 100 determines the device from which the operation information has been input as an active controller, and registers the device from which the input has been provided and the selected character in association with each other (step S108).

Then, information processing device 100 determines whether or not a predetermined number of devices have already been registered as active controllers (step S110). When the predetermined number of devices have already been registered as the active controllers (YES in step S110), information processing device 100 has the present process end.

In contrast, when the predetermined number of devices have not yet been registered as active controllers (NO in step S110), information processing device 100 determines whether or not end of character selection processing has been indicated (step S112). When end of the character selection processing is indicated (YES in step S112), the present process ends. When end of the character selection processing has not been indicated (NO in step S112), information processing device 100 repeats the processing in step S104 and subsequent steps.

G. Key Configuration

In each of information processing device 100 and portable terminal 200 configuring information processing system 1 in the present embodiment, key allocation information showing correspondence between an operation device such as a hard key or a button provided in each device (hereinafter also collectively referred to as a "key") and an operation in an application executed in each device can be held. Namely, a user can freely define what kind of operation is performed by each key in each device in an application which is being executed. For example, portable terminal 200 can hold key allocation information indicating correspondence between each key and an operation in application B2.

As the user can freely define such key allocation information, the user can have higher operability and enjoy an application. A function for setting and making use of such key allocation information is also hereinafter collectively referred to as a "key configuration function."

Referring to FIG. 16, key allocation information held in each device is defined individually for each piece of identification information (key allocation information number), and for example, a behavior of a character operated on an application is defined for each of an "A button", a "B button", an "X button", a "Y button", an up button (of a cross-shaped key)," a "down button (of the cross-shaped key)," a "right button (of the cross-shaped key)," and a "left button (of the cross-shaped key)." For facilitated identification during use by the user, the user can freely give an alias name.

In information processing system 1 in the present embodiment, a configuration for mutually making use of the key allocation information between information processing device 100 and portable terminal 200 is available. Namely, information processing device 100 receives key allocation information held in wirelessly connected portable terminal 200 and makes the key allocation information available. In contrast, portable terminal 200 may receive key allocation information held in wirelessly connected information processing device 100 and makes the key allocation information available.

Figure 17:
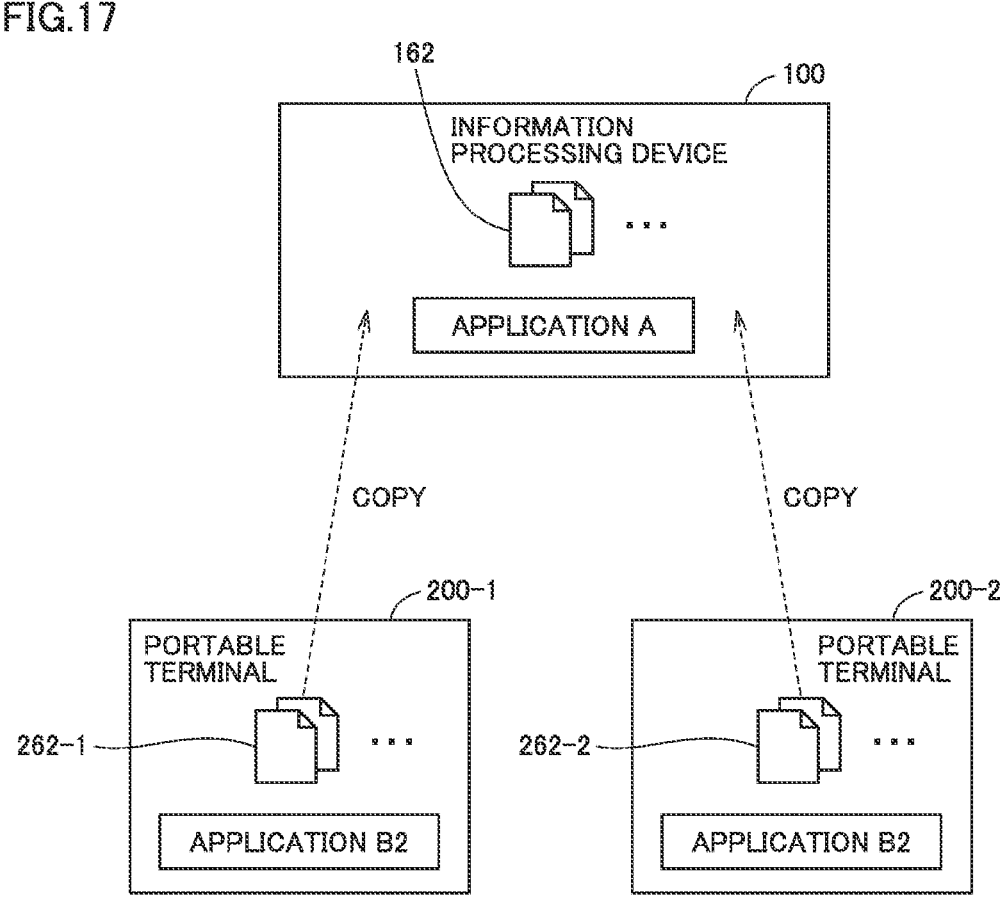
FIG. 17 shows an exemplary illustrative non-limiting schematic diagram illustrating a part of a key configuration function of the information processing system according to the present embodiment.

Referring to FIG. 17, portable terminals 200-1 and 200-2 hold key allocation information 262-1 and key allocation information 262-2, respectively. Setting and use by the user of key allocation information 262-1 and key allocation information 262-2 is allowed as application B2 installed in portable terminals 200-1 and 200-2 is executed. Though not necessarily limited, application B1 provided by information processing device 100 does not include a program for setting and use of the key allocation information, and setting and use of the key allocation information is allowed only in portable terminal 200 in which application B2 has been installed (or application B2 can be made use of in some form). Namely, portable terminal 200 can transmit the key allocation information to information processing device 100 when application B2 has been obtained from a medium or a device different from information processing device 100.

In the configuration example shown in FIG. 17, portable terminals 200-1 and 200-2 are both wirelessly connected to information processing device 100. In response to an operation by the user onto information processing device 100 and/or an operation by the user onto portable terminals 200-1 and 200-2, key allocation information 262-1 and key allocation information 262-2 held in portable terminals 200-1 and 200-2 are copied to information processing device 100 and it can be made use of also in information processing device 100. Key allocation information 262 received from portable terminal 200 may further be changed in information processing device 100.

Though a form in which the key allocation information held in portable terminal 200 is copied to information processing device 100 and used therein has been described with reference to FIG. 17, the key allocation information held in information processing device 100 may be configured to be copied to portable terminal 200 and made use of therein.

Figure 18A:
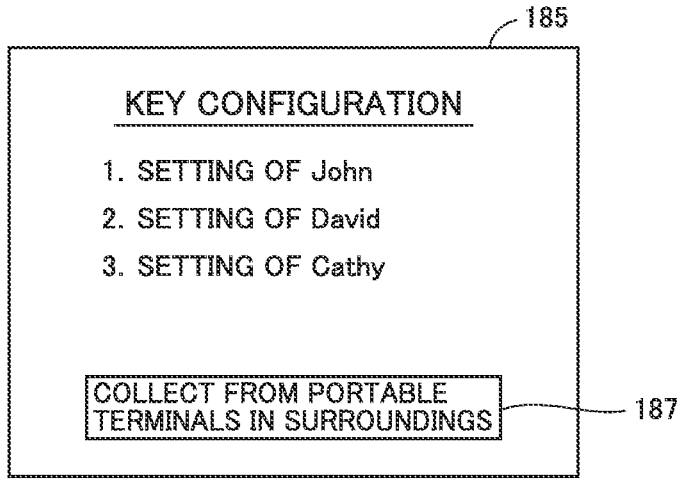
FIGS. 18A to 18C show exemplary illustrative non-limiting diagrams illustrating an example of transition of screens in connection with the key configuration function of the information processing system according to the present embodiment.

FIG. 18 shows one example of transition of screens in connection with the key configuration function of information processing system 1 in the present embodiment. For example, when the user selects "3. key configuration" in menu screen 180 shown in FIG. 8A, menu screen 180 makes transition to a key configuration selection screen 185 shown in FIG. 18A. Selection screen 185 displays currently set key allocation information (key configuration) in a list. The user can select any key allocation information in selection screen 185 and can also set any key allocation information through a not-shown screen for making change.

Figure 18B:
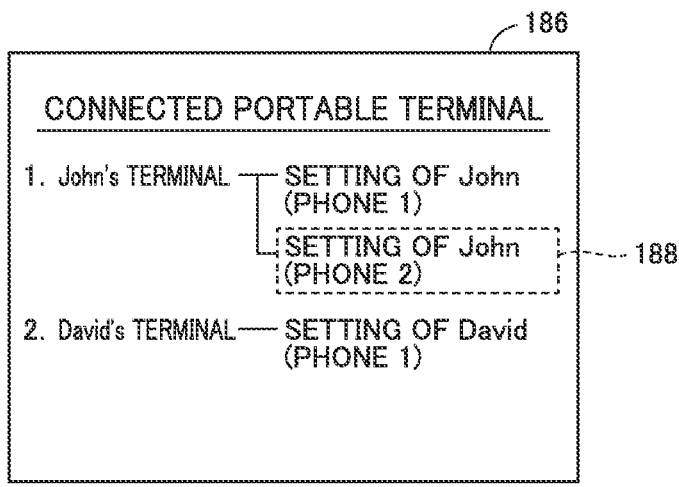
Figure 18C:
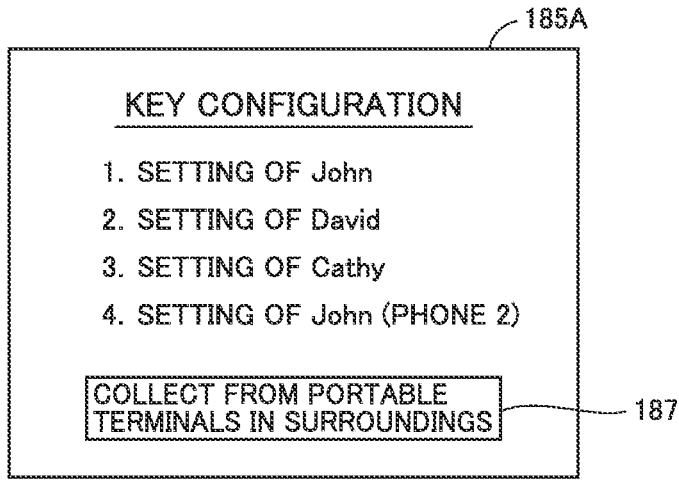

When the user selects a button 187 "collect from portable terminals in surroundings" in selection screen 185 shown in FIG. 18A, information processing device 100 obtains key allocation information held in each portable terminal 200 from each connected portable terminal 200 and displays in a list, contents of the obtained key allocation information (a status display screen 186 shown in FIG. 18B). Status display screen 186 shows a name of a terminal of portable terminal 200 (for example, "John's terminal" or "David's terminal") connected to information processing device 100 and a name of key allocation information held in each portable terminal 200 (a name defined in a field of "alias name" in the key allocation information shown in FIG. 16). When the user operates a cursor 188 on status display screen 186 and selects target key allocation information, the selected key allocation information is copied from portable terminal 200 of interest to information processing device 100. Then, status display screen 186 makes transition to a selection screen 185A shown in FIG. 18C. As key allocation information displayed on selection screen 185A in a list, key allocation information obtained from portable terminal 200 (in this example, "setting of John (phone 2)") is selectably added. Then, the user can select any key allocation information from among a plurality of candidates including the key allocation information obtained form portable terminal 200, and can use the key allocation information.

Figure 19:
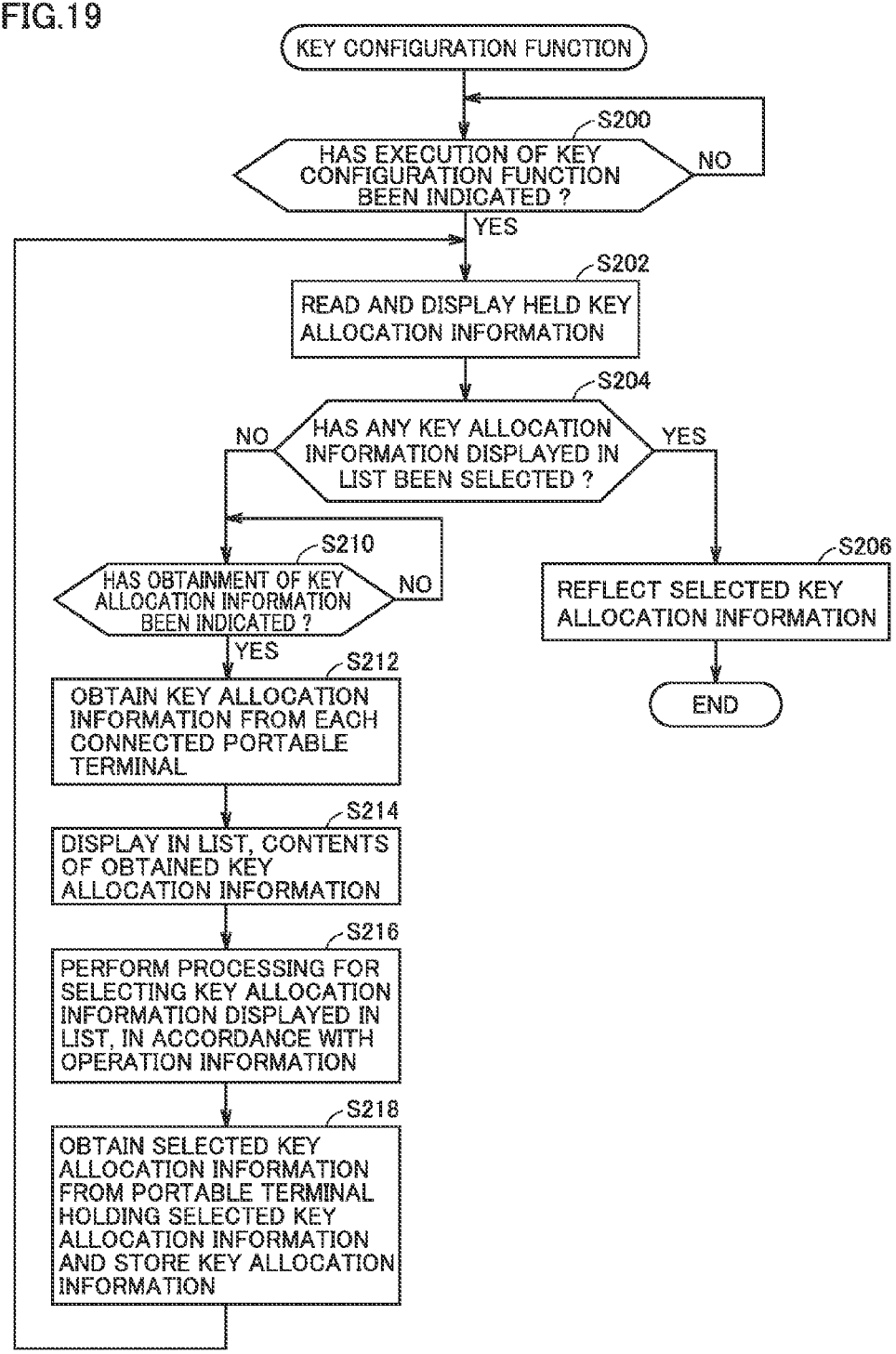
FIG. 19 shows an exemplary illustrative non-limiting flowchart illustrating a processing procedure in connection with the key configuration function provided by the information processing device according to the present embodiment.

FIG. 19 shows a processing procedure in connection with the key configuration function provided by information processing device 100 in the present embodiment. Each step shown in FIG. 19 is implemented as system LSI 110 (or a processor) of information processing device 100 executes application A.

Referring to FIG. 19, information processing device 100 determines whether or not execution of the key configuration function has been indicated (step S200). When execution of the key configuration function has not been indicated (NO in step S200), information processing device 100 repeats the processing in step S200.

When execution of the key configuration function has been indicated (YES in step S200), information processing device 100 reads the held key allocation information and displays a content thereof as key configuration selection screen 185 (see FIG. 18A) (step S202). In succession, information processing device 100 determines whether or not any key allocation information displayed in a list on key configuration selection screen 185 has been selected (step S204). When any key allocation information has been selected (YES in step S204), information processing device 100 reflects the selected key allocation information (step S206). Then, information processing device 100 has the present process end.

In contrast, when no key allocation information has been selected (NO in step S204), information processing device 100 determines whether or not obtainment of the key allocation information has been indicated (step S210). When obtainment of the key allocation information has not been indicated (NO in step S210), information processing device 100 repeats the processing in step S210.

When obtainment of the key allocation information has been indicated (YES in step S210), information processing device 100 starts processing for obtaining the key allocation information held in portable terminal 200 connected to information processing device 100. Information processing device 100 obtains the key allocation information held in each portable terminal 200 from each connected portable terminal 200 (step S212) and displays in a list, contents of the obtained key allocation information (step S214). Then, information processing device 100 performs processing for selecting key allocation information displayed in a list, in accordance with operation information (step S216). When the user selects any key allocation information, information processing device 100 obtains the selected key allocation information from portable terminal 200 holding the selected key allocation information, and stores the selected key allocation information (step S218). Then, the processing in step S202 and subsequent steps is performed.

The key configuration function described above is not an essential feature of information processing system 1 as well as information processing device 100 and portable terminal 200 configuring the same. Namely, information processing system 1 as well as information processing device 100 and portable terminal 200 configuring the same not having the key configuration function may be encompassed in the scope of protection.

H. Character Customization

Customization or modification of a character is allowed in each of information processing device 100 and portable terminal 200 configuring information processing system 1 in the present embodiment. Namely, the user can freely change at least in part, appearance or characteristics of a character operated on an application. As the user freely changes appearance, a characteristic value, or an attribute of such a character, the user can have fun of ability to operate a character different from a character of others or can feel uniqueness. A function for a user to freely be able to change appearance, a characteristic value, or an attribute of such a character is also hereinafter collectively referred to as a "character customization function."

Figure 20:
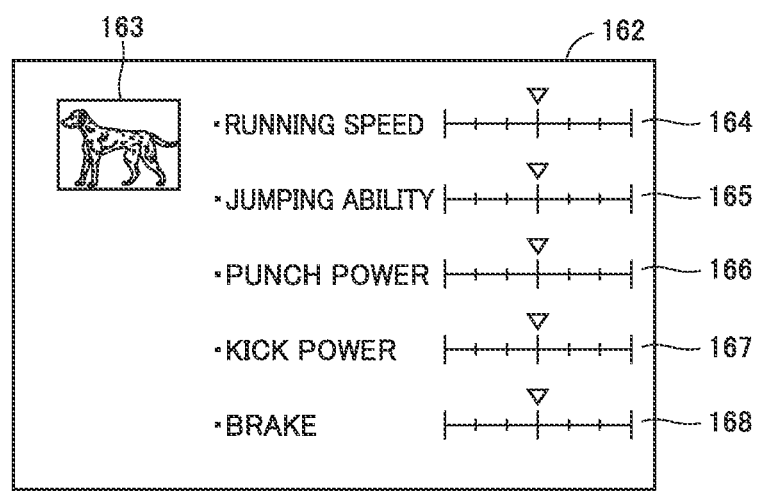
FIG. 20 shows an exemplary illustrative non-limiting diagram illustrating one example of a character customization function provided by the information processing system according to the present embodiment.

Referring to FIG. 20, in each of information processing device 100 and portable terminal 200, the user can select any character and can freely change appearance, a characteristic value, or an attribute of the character. In a character customization screen 162 shown in FIG. 20, sliders 164 to 168 for changing one characteristic value or a plurality of characteristic values are displayed in association with an icon image 163 showing a selected character. The user changes a characteristic value of a selected character by adjusting as appropriate sliders 164 to 168. The changed characteristic value of the character is stored as character customization information.

Instead of or in addition to such a configuration for the user to arbitrarily change a characteristic value of a character, a characteristic value may be changed in response to customization by a user of a character (for example, attachment of any part or item to a character).

In information processing system 1 in the present embodiment, a configuration for mutually making use of character customization information between information processing device 100 and portable terminal 200 is available. More specifically, portable terminal 200 is configured to transmit information on an object (in this example, a character) held in advance to information processing device 100, and when information processing device 100 receives information on the object from portable terminal 200, information processing device 100 makes the received information on the object available in application A. In contrast, portable terminal 200 may receive information on an object from information processing device 100 and make the received information on the object available in application B2.

Similarly to the key configuration function shown in FIG. 17 described above, any portable terminal 200 holds character customization information. As application B2 installed in each portable terminal 200 is executed, character customization screen 162 as shown in FIG. 20 is displayed and customization of a character is allowed. Though not necessarily limited, application B1 provided by information processing device 100 does not include a program for providing a character customization function, and the character customization function is available only in portable terminal 200 in which application B2 has been installed (or application B2 is available in some form).

Character customization information can be exchanged with portable terminal 200 wirelessly connected to information processing device 100. Namely, portable terminal 200 can transmit character customization information to information processing device 100 when application B2 has been obtained from a medium or a device different from information processing device 100.

Thus, in response to an operation by the user onto information processing device 100 and/or an operation by the user onto portable terminal 200, character customization information held in portable terminal 200 can be copied to information processing device 100 and made use of also in information processing device 100. Character customization information received from portable terminal 200 may further be changed in information processing device 100.

In addition to or instead of such a form that character customization information held in portable terminal 200 is copied to information processing device 100 and used therein, character customization information held in information processing device 100 may be configured to be copied to portable terminal 200 and made use of therein.

Since a user interface for exchanging character customization information between information processing device 100 and portable terminal 200 is the same as transition of screens in connection with the key configuration function described with reference to FIG. 18, detailed description will not be repeated.

FIG. 21 shows a processing procedure in connection with the character customization function provided by information processing device 100 in the present embodiment. Each step shown in FIG. 21 is implemented as system LSI 110 (or a processor) of information processing device 100 executes application A.

Referring to FIG. 21, information processing device 100 determines whether or not activation of the character customization function has been indicated (step S300). When activation of the character customization function has not been indicated (NO in step S300), information processing device 100 repeats the processing in step S300.

When activation of the character customization function has been indicated (YES in step S300), information processing device 100 determines whether or not reflection of character customization has been indicated (step S302). When reflection of character customization has been indicated (YES in step S302), information processing device 100 reads the held character customization information and displays character selection screen 190 (see FIG. 14) reflecting a content thereof (step S304). Then, the processing in step S104 and subsequent steps shown in FIG. 15 is performed.

When reflection of character customization has not been indicated (NO in step S302), information processing device 100 determines whether or not obtainment of character customization has been indicated (step S306). When obtainment of character customization has not been indicated (NO in step S306), information processing device 100 repeats the processing in step S306.

When obtainment of character customization has been indicated (YES in step S306), information processing device 100 starts processing for obtaining character customization information held in portable terminal 200 connected to information processing device 100. Information processing device 100 obtains character customization information held in each portable terminal 200 from each connected portable terminal 200 (step S308) and displays in a list, contents of the obtained character customization information (step S310). Then, information processing device 100 performs processing for selecting character customization information displayed in a list, in accordance with operation information (step S312). When the user selects any character customization information, information processing device 100 obtains the selected character customization information from portable terminal 200 holding the selected character customization information and stores the selected character customization information (step S314). Then, the processing in step S302 and subsequent steps is performed.

The character customization function described above is not an essential feature of information processing system 1 as well as information processing device 100 and portable terminal 200 configuring the same. Namely, information processing system 1 as well as information processing device 100 and portable terminal 200 configuring the same not having the character customization function may be encompassed in the scope of protection.

I. Other Forms

A device and software configuring information processing system 1 are not limited to those described in the present embodiment. For example, at least some of those described as the functions of information processing device 100 in the present embodiment may be contained in an external server device. Namely, instead of single information processing device 100, a system constituted of a server and a terminal may be employed. In this case, each means in the system is implemented by processing by a processor of information processing device 100, processing by a processor of the server, or cooperative processing by the processor of information processing device 100 and the processor of the server. Allocation of processing can be designed as appropriate based on common general technical knowledge of a person skilled in the art.

A program or an application executed by information processing device 100 and/or portable terminal 200 is not limited to that provided by a storage medium. Various programs or applications may be provided by downloading through such a network as the Internet. System software of information processing device 100 and/or portable terminal 200 may be provided by a storage medium or through downloading.

J. Advantages

According to the present embodiment, portable terminal 200 which can independently execute various programs can be used like wireless controller 300 for enjoying an application executed in information processing device 100. Therefore, a user can use a device with which the user himself/herself is familiar as a controller, and can enjoy an application more comfortably.

According to the present embodiment, since any selected one(s) of portable terminal 200, wireless controller 300, and wired controller can be used as controller(s), more choices of controllers can be offered and how to play can increasingly be various.

Furthermore, not only portable terminal 200 can serve as a controller, but also key allocation information or character customization information held in portable terminal 200 can be transmitted to information processing device 100 and an application can be enjoyed also in information processing device 100 with the use of the same information, and thus zest can be enhanced. For example, one person or a few persons can enjoy an application with the use of portable terminal(s) 200 and concurrently a larger number of persons can enjoy a similar application in information processing device 100 in a similar environment.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing system, comprising:
an information processing device configured to execute a first application;
at least one wireless controller which can wirelessly be connected to the information processing device; and
at least one portable terminal which is adapted to execute a second application and display a result of execution of the second application and has a wireless communication function,
the wireless controller being configured to establish wireless connection to the information processing device in accordance with a first procedure and transmit first operation information representing an input operation onto the wireless controller to the information processing device, and
the portable terminal being configured to establish wireless connection to the information processing device in accordance with a second procedure different from the first procedure and transmit second operation information representing an input operation onto the portable terminal to the information processing device, wherein:
the first procedure includes an input operation onto the wireless controller,
the second procedure includes an input operation for executing the second application in the portable terminal and an input operation onto the portable terminal while the second application is running, and
the portable terminal obtains the second application from the information processing device.

2. The information processing system according to claim 1, wherein
the second procedure includes more procedures than the first procedure.

3. The information processing system according to claim 1, wherein
the first procedure can be performed at any time, and
the second procedure is allowed to be performed when the information processing device is in a prescribed state.

4. The information processing system according to claim 1, wherein
the information processing device is configured to activate as a controller to be used in the first application, among wireless controller(s) and portable terminal(s) wirelessly connected to the information processing device, any onto which a prescribed input operation has been performed while the first application provides display of a prescribed screen.

5. The information processing system according to claim 4, wherein
the total number of the wireless controllers and the portable terminals which can wirelessly be connected to the information processing device is greater than the number of controllers used in the first application, and
the information processing device activates successively as controllers, among the wireless controller(s) and the portable terminal(s) wirelessly connected to the information processing device, any onto which the prescribed input operation has been performed, until the number of the activated wireless controllers and the portable terminals reaches a prescribed number.

6. The information processing system according to claim 4, wherein
the portable terminal is provided with a plurality of types of keys for accepting an input operation,
the portable terminal is configured to hold key allocation information indicating correspondence between each key and an operation in the second application, and
the information processing device receives the key allocation information held in the wirelessly connected portable terminal and makes the key allocation information available.

7. The information processing system according to claim 6, wherein
the portable terminal is configured to transmit the key allocation information to the information processing device when the second application has been obtained from a medium or a device different from the information processing device.

8. The information processing system according to claim 4, wherein
the portable terminal is configured to transmit information on an object held in advance to the information processing device, and
when the information processing device receives the information on the object from the portable terminal, the information processing device makes the received information on the object available in the first application.

9. The information processing system according to claim 8, wherein
when the second application has been obtained from a medium or a device different from the information processing device, the portable terminal is configured to transmit the object to the information processing device.

10. The information processing system according to claim 1, further comprising at least one wired controller which can be connected through a wire to the information processing device.

11. The information processing system according to claim 1, wherein
the portable terminal is provided with a plurality of types of keys for accepting an input operation,
the portable terminal is configured to hold key allocation information defining correspondence between each key and an operation in the second application, and
the information processing device is configured to receive the key allocation information held in the wirelessly connected portable terminal and make the key allocation information available.

12. An information processing device configured to execute a first application, the information processing device comprising:
a first circuitry for wireless connection to at least one wireless controller; and
a second circuitry for wireless connection to at least one portable terminal having a wireless communication function, the portable terminal being adapted to execute a second application and display a result of execution of the second application,
the first circuitry being configured to establish wireless connection to the wireless controller in accordance with a first procedure and receive first operation information representing an input operation onto the wireless controller, and
the second circuitry being configured to establish wireless connection to the portable terminal in accordance with a second procedure different from the first procedure and receive second operation information representing an input operation onto the portable terminal, wherein:
the first procedure includes an input operation onto the wireless controller,
the second procedure includes an input operation for executing the second application in the portable terminal and an input operation onto the portable terminal while the second application is running, and
the portable terminal obtains the second application from the information processing device.

13. The information processing device according to claim 12, wherein
the portable terminal is provided with a plurality of types of keys for accepting an input operation,
the portable terminal is configured to hold key allocation information defining correspondence between each key and an operation in the second application, and
the information processing device is configured to receive the key allocation information held in the wirelessly connected portable terminal and make the key allocation information available.

14. A non-transitory storage medium encoded with a computer readable information processing program executed by a computer configured to execute a first application, the computer including circuitry for wireless connection to at least one wireless controller and circuitry or wireless connection to at least one portable terminal having a wireless communication function, the portable terminal being adapted to execute a second application and display a result of execution of the second application, the information processing program causing the computer to perform functionality, comprising:
establishing wireless connection to the wireless controller in accordance with a first procedure and receiving first operation information representing an input operation onto the wireless controller; and
establishing wireless connection to the portable terminal in accordance with a second procedure different from the first procedure and receiving second operation information representing an input operation onto the portable terminal, wherein:
the first procedure includes an input operation onto the wireless controller,
the second procedure includes an input operation for executing the second application in the portable terminal and an input operation onto the portable terminal while the second application is running, and
the portable terminal obtains the second application from the information processing device.

15. The non-transitory storage medium according to claim 14, wherein
the portable terminal is provided with a plurality of types of keys for accepting an input operation,
the portable terminal is configured to hold key allocation information defining correspondence between each key and an operation in the second application, and
the information processing device receives the key allocation information held in the wirelessly connected portable terminal and makes the key allocation information available.

16. An information processing method performed in an information processing system, the information processing system including an information processing device configured to execute a first application, at least one wireless controller which can wirelessly be connected to the information processing device, and at least one portable terminal which is adapted to execute a second application and display a result of execution of the second application and has a wireless communication function, comprising:
the wireless controller establishing wireless connection to the information processing device in accordance with a first procedure and transmitting first operation information representing an input operation onto the wireless controller to the information processing device; and
the portable terminal establishing wireless connection to the information processing device in accordance with a second procedure different from the first procedure and transmitting second operation information representing an input operation onto the portable terminal to the information processing device, wherein:
the first procedure includes an input operation onto the wireless controller, the second procedure includes an input operation for executing the second application in the portable terminal and an input operation onto the portable terminal while the second application is running, and the portable terminal obtains the second application from the information processing device.

17. The information processing method according to claim 16, wherein the portable terminal is provided with a plurality of types of keys for accepting an input operation, the portable terminal is configured to hold key allocation information defining correspondence between each key and an operation in the second application, and the information processing device receives the key allocation information held in the wirelessly connected portable terminal and makes the key allocation information available.

* * * * *